(12) United States Patent
Schmied

(10) Patent No.: US 10,883,507 B2
(45) Date of Patent: Jan. 5, 2021

(54) METHOD FOR CONTROLLING A CENTRIFUGAL PUMP, AND ASSOCIATED PUMP SYSTEM

(71) Applicant: WILO SE, Dortmund (DE)

(72) Inventor: Stephan Schmied, Dortmund (DE)

(73) Assignee: Wilo SE, Dortmund (DE)

( * ) Notice: Subject to any disclaimer, the term of this patent is extended or adjusted under 35 U.S.C. 154(b) by 311 days.

(21) Appl. No.: 15/774,406

(22) PCT Filed: Oct. 26, 2016

(86) PCT No.: PCT/EP2016/001776
§ 371 (c)(1),
(2) Date: Aug. 8, 2018

(87) PCT Pub. No.: WO2017/080632
PCT Pub. Date: May 18, 2017

(65) Prior Publication Data
US 2019/0331119 A1    Oct. 31, 2019

(30) Foreign Application Priority Data
Nov. 9, 2015    (DE) .................. 10 2015 014 378

(51) Int. Cl.
*F04D 15/00*    (2006.01)
*F24D 19/10*    (2006.01)
(Continued)

(52) U.S. Cl.
CPC ..... *F04D 15/0066* (2013.01); *F24D 19/1012* (2013.01); *G05B 13/00* (2013.01);
(Continued)

(58) Field of Classification Search
CPC . F04D 15/0066; F04D 19/1012; G05B 13/00; G05B 13/1041; G05D 7/0133; G05D 11/003; G05D 11/008; F24D 2220/0207
See application file for complete search history.

(56) References Cited

U.S. PATENT DOCUMENTS

| 4,316,434 A * | 2/1982 | Bailey .................. F22B 27/12 |
| | | 122/20 B |
| 2006/0280292 A1* | 12/2006 | McCarthy, Jr. ........... F25B 1/06 |
| | | 378/200 |
| 2017/0219219 A1* | 8/2017 | Miller ................. F24D 19/1012 |

FOREIGN PATENT DOCUMENTS

| DE | 19912588 A1 | 9/2000 |
| DE | 10163987 A1 | 7/2003 |

(Continued)

*Primary Examiner* — Mark A Connolly
(74) *Attorney, Agent, or Firm* — Moreno IP LLC

(57) ABSTRACT

The invention relates to a method for controlling at least one first circulation pump (17b, 17c) of a heating or cooling system (1) having a primary circuit (2, 2a) and a secondary circuit (4, 30a) coupled therewith at a transfer point (3, 29). The first circulation pump (17, 17b, 17c, 17b') conveys a heating or cooling medium in the primary circuit (2, 2a), and in the second secondary circuit (4, 30a), at least one second circulation pump (12, 17d) is located that conveys a heating or cooling medium in at least one partial area of the secondary circuit (4, 30a). The volume flow rate (formula I) of the first circulation pump (17, 17b, 17c, 17b') is controlled in functional dependence on the volume flow rate (formula II) of the secondary circuit (4, 30) behind the transfer point (3, 29). In this way, a demand based, and thus an energy-efficient control of the primary-side circulation pump is achieved. The invention further relates to a pump system, comprising the at least one first and the at least one second circulation pump for carrying out the method.

19 Claims, 9 Drawing Sheets

(51) Int. Cl.
*G05B 13/00* (2006.01)
*G05D 11/00* (2006.01)
*G05D 7/01* (2006.01)
G05B 13/04 (2006.01)

(52) U.S. Cl.
CPC ......... *G05D 7/0133* (2013.01); *G05D 11/003* (2013.01); *G05D 11/008* (2013.01); *F24D 2220/0207* (2013.01); *G05B 13/041* (2013.01)

(56) References Cited

FOREIGN PATENT DOCUMENTS

| | | |
|---|---|---|
| DE | 102005041486 A1 | 3/2006 |
| DE | 102007040629 A1 | 3/2009 |
| DE | 102009017423 A1 | 10/2010 |
| EP | 0892223 A2 | 1/1999 |

\* cited by examiner ized in the pump electronics system of the consumer circuit pumps. Alternatively, to indirectly influencing the pump speed via actuators, the speed of the circuit pump can be directly influence, e.g. through temperature control, moisture control or volume flow rate control. Conversely, a demand-based control of the primary side of the transfer point to the pumps arranged in the consumer circuit is not established. Different methods are known to control the primary-side pump corresponding to one or a plurality of temperature differences on the hydraulic separator or on the heat exchanger. These methods are costly to measure and technically control and/or only allow for an incomplete adaptation to requirements.

METHOD FOR CONTROLLING A CENTRIFUGAL PUMP, AND ASSOCIATED PUMP SYSTEM

FIELD

The invention relates to a method for controlling at least one first circulation pump of a heating or cooling system, having a primary circuit and a secondary circuit coupled therewith at a transfer point, wherein the first circulation pump conveys a heating or cooling medium in the primary circuit and in the secondary circuit at least one speed-controlled second circulation pump is located that conveys a heating or cooling medium in at least one partial area of the secondary circuit.

BACKGROUND

In systems for the heating and/or cooling of buildings with liquid heat carriers, it is common to divide the consumers amongst a plurality of consumer circuits. This division can, for example, be made separated by building parts or separated by different consumer types. Different consumer types are, for example, heating elements, or heating and cooling surfaces for underfloor heating or ceiling heating and cooling. With respect to building parts, a division can, for example, be made by apartments or floors. Each consumer circuit then has one or more consumers as well as a consumer circuit pump supplying this or these. In addition, usually a regulating control element is arranged in each consumer circuit of at least one consumer which adjusts the volume flow rate through the respective consumer or consumers. Alternatively, the regulation of the volume flow rate through the consumer can be carried out directly by speed regulation of the pump in the consumer circuit.

In general, consumer circuits are connected to shared supply lines, i.e. a shared flow line and return manifold with at least one heating or cooling generator of one or more generator circuits. In combined systems which can both heat and cool, the consumers are respectively connected to at least one heating generator and at least one cooling generator each of its own generator circuit, wherein the generator circuit is optionally in operation with one or the other generator type.

The generator circuit or generator circuits are often coupled to the consumer circuit via a transfer point. Such a transfer point can, for example, be a hydraulic separator, a heat exchanger or an overflow line, wherein the different transfer points have different properties and fulfill different requirements. The coupling can be carried out directly or by means of a feeder circuit if, for example, due to the distance between the generator circuit and the consumer circuit large pressure losses much be overcome. This results in two transfer points; a first transfer point between the generator circuit(s) and the feeder circuit and a second transfer point between the feeder circuit and the consumer circuit. From the view of the transfer point to the consumer circuits, the generator circuit(s) or the feeder circuits are located on the primary side, whereas the consumer circuits are located on the secondary side of the transfer point.

In general, the required volume flow rates in the system are defined by the consumer. The volume flow rate is usually controlled in a consumer circuit via the actuator assigned to the individual consumers. In order to thus meaningfully adapt the operation of the consumer circuit pumps, a variable speed centrifugal pump with a pump electronics system are implemented, in which a so-called constant pressure controller, also known as a $\Delta$p-c controller, and a variable pressure controller, a so-called $\Delta$p-v controller are provided as proved control types which can be selected in the pump electronics system of the consumer circuit pumps. Alternatively, to indirectly influencing the pump speed via actuators, the speed of the circuit pump can be directly influence, e.g. through temperature control, moisture control or volume flow rate control. Conversely, a demand-based control of the primary side of the transfer point to the pumps arranged in the consumer circuit is not established. Different methods are known to control the primary-side pump corresponding to one or a plurality of temperature differences on the hydraulic separator or on the heat exchanger. These methods are costly to measure and technically control and/or only allow for an incomplete adaptation to requirements.

SUMMARY

It is thus the object of the present invention to provide a demand-based control for a variable speed centrifugal pump which is arranged on the primary side of a transfer point to consumer circuits in a heating or cooling system.

This object is achieved through the method with the features of claim 1. Advantageous further developments are provided in the dependent claims and are described in the following.

According to the invention, a method for controlling at least one first circulation pump of a heating or cooling system is proposed, having a primary circuit and a secondary circuit coupled therewith at a transfer point, wherein the first circulation pump conveys a heating or cooling medium in the primary circuit and in the secondary circuit at least one speed-controlled second circulation pump is located that conveys a heating or cooling medium in at least one partial area of the secondary circuit, wherein the volume flow rate of the first circulation pump is controlled in functional dependence of the volume flow rate of the secondary circuit behind the transfer point.

Through such a volume flow rate control depending on the volume flow rate of the secondary side a demand-based and thus energy-efficient control of the pump on the primary side may be realized. The primary volume flow rate is thus configured to be high enough to provide the consumers with the desired heating output, and on the other hand not to be unnecessarily high, in order to save energy.

The control according to the invention can be applied in all heating or cooling systems which have a primary and secondary circuit coupled through at least one transfer point. Thus, the primary circuit generally corresponds to the generator side, and the secondary circuit generally corresponds to the consumer side. Independently of one another, the primary circuit can comprise one or a plurality of generator circuits and the secondary circuit can comprise one or a plurality of consumer circuits. Primary and secondary circuits can be directly coupled to one another via the transfer point. However, alternatively, a feeder circuit can lie between the primary and secondary circuit which is coupled to the primary circuit and the secondary circuit via a corresponding transfer point.

Corresponding to this large number of system topologies, the method according to the invention can be used in different ways. Thus, in regard to the system topology alone
- in a first design variant a generator pump is coupled to a consumer pump,
- in a second design variant a generator pump is coupled to two or more parallel consumer pumps (see FIG. 3), in a third design variant two or more parallel generator pumps are coupled to two or more parallel consumer pumps (see FIGS. 5, 6), in a fourth design variant a feeder pump is coupled to a consumer pump, in a fifth design variant a feeder pump is coupled to two or more parallel consumer pumps (see FIGS. 1, 2), in a sixth design variant a generator pump is coupled to a feeder pump (see FIG. 7), in a seventh design variant two or more parallel generator pumps are coupled to a feeder pump (see FIG. 8).

As with design variants four to seven only half of the system is ever concerned, further design variants are covered by the volume flow rate control with a combination of variants four and six, four and seven, five and six (see FIG. 4) as well as five and seven. The different variants are described in the following.

According to the invention, the volume flow rate of the first circulation pump in functional dependence of the volume flow rate of the secondary circuit is controlled behind the transfer point. This can be mathematically described by $\dot{V}_{soll} = f(\dot{V}_{sec})$, wherein $\dot{V}_{soll}$ is the volume flow rate of the first circulation pump to be controlled, $\dot{V}_{sec}$ is the volume flow rate of the secondary circuit behind the transfer point and f is a mathematical function which assigns a corresponding set volume flow rate $\dot{V}_{soll}$ for the circulation pump to a secondary-side volume flow rate $\dot{V}_{sec}$. If on the primary side only a first circulation pump is provided (first, second, fourth, fifth, sixth design variant), the set volume flow rate corresponds to the primary-side volume flow rate $\dot{V}_{pri}$ so that then $\dot{V}_{pri} = f(\dot{V}_{sec})$. If on the primary side two or more first circulation pumps are provided (design variants three and seven), the set volume flow rate corresponds to a generator-specific volume flow rate $\dot{V}_{pri,i}$, i.e. the volume flow rate of a generator circuit so that then $\dot{V}_{pri,i} = f(\dot{V}_{sec})$.

According to a design variant, the first circulation pump can be controlled in such a way that the volume flow rate $\dot{V}_{pri}$ of the primary circuit is in front of the transfer point in a predetermined ratio to the volume flow rate $\dot{V}_{sec}$ of the secondary circuit behind the transfer point. Thus, the functional dependence can be mathematically described by $\dot{V}_{pri} = a \cdot \dot{V}_{sec}$, wherein a represents the ratio between the volume flow rate $\dot{V}_{pri}$ of the primary circuit in front of the transfer point and the volume flow rate $\dot{V}_{sec}$ of the secondary circuit behind the transfer point. The functional dependence is thus described by a linear dependence. In the simplest case, it can be that a=1. This means that the first circulation pump can be controlled in such a way that the volume flow rate $\dot{V}_{pri}$ of the primary circuit is in front of the transfer point corresponds to the volume flow rate $\dot{V}_{sec}$ of the secondary circuit behind the transfer point. However, in order to have sufficient control reserves in the secondary circuit, a ratio between 1.0 and 1.3 should be chosen.

Alternatively, the first circulation pump can be controlled in such a way that the volume flow rate $\dot{V}_{pri}$ of the primary circuit in front of the transfer point maintains a predetermined distance from the volume flow rate $\dot{V}_{sec}$ of the secondary circuit behind the transfer point. Thus, the functional dependence can be mathematically described by $\dot{V}_{pri} = \dot{V}_{sec} + b$, wherein b represents the distance between the volume flow rate $\dot{V}_{pri}$ of the primary circuit in front of the transfer point and the volume flow rate $\dot{V}_{sec}$ of the secondary circuit behind the transfer point, practically forms an offset that is greater than zero.

Furthermore, a combination of the latter two variants can occur, wherein the first circulation pump is then controlled in such a way that the functional dependence of the volume flow rate $\dot{V}_{pri}$ of the primary circuit in front of the transfer point from the volume flow rate $\dot{V}_{sec}$ of the secondary circuit behind the transfer point corresponds to the function $\dot{V}_{pri} = a \cdot \dot{V}_{sec} + b$, wherein the coefficient a describes a linear dependence of the two volume flow rates the coefficient b describes an offset.

The primary circuit can comprise at least one generator circuit, in which at least one heating or cooling generator heats or cools the heating or cooling medium and conveys the heating or cooling medium of the generator circuit through a generator pump connected in series to the heating or cooling generator, wherein the first circulation pump to be controlled is this generator pump.

Alternatively to this or in further development of this variant, the primary circuit can comprise a number (m) of generator circuits connected in parallel, in which at least one heating or cooling generator respectively heats or cools the heating or cooling medium and a generator pump connected in series with the respective heating or cooling generator conveys a generator-specific volume flow rate $\dot{V}_{pri,i}$, wherein the first circulation pump to be controlled is one of these parallel generator pumps.

Preferably, in this case the first circulation pump to be controlled is the generator pump that lies in the peak load generator circuit. This means that the volume flow rate control according to the invention is only used for this peak load pump. However, the generator pumps of the other base load generator circuits are not controlled or are controlled in another way.

As mentioned above, the generator circuit or generator circuits can be directly connected to the secondary circuit by means of the transfer point, i.e. without intermediate connection of a feeder circuit.

However, according to an alternative variant, such a feeder circuit can be provided in order to compensate for pressure loss over long conveying distances. Such a feeder circuit can be provided from the view of the transfer point to the secondary circuit/consumer side as part of the primary circuit, i.e. as part of the generator circuit. The generator circuit or generator circuits are then indirectly connected to the secondary circuit by means of the transfer point. Thus, the primary circuit can comprise a feeder circuit which is coupled with the secondary circuit at the transfer point, wherein a feeder pump lies in the feeder circuit which conveys a heating or cooling medium in the feeder circuit, and wherein the first circulation pump to be controlled is this feeder pump.

However, it is also possible that the feeder circuit is part of the secondary circuit or even forms this. In this case, the transfer point couples the primary circuit to the generator circuit(s) with this feeder circuit. Thus, a feeder pump also lies in the feeder circuit which conveys heating or cooling in the feeder circuit. As this feeder pump is part of the secondary circuit, the second circulation pump thus corresponds to this feeder pump. This variant is particularly to be understood in combination with a generator pump which corresponds to the first circulation pump to be controlled. The feeder pump can be uncontrolled in the same way as the second pump or be autonomously controlled, e.g. corresponding to a differential pressure, a temperature or a volume flow rate.

However, according to another design variant, this feeder pump can be volume flow rate controlled as well as the generator pump according to the method according to the invention. There are then two first circulation pumps to be controlled in the primary circuit or on the generator side. In this variant the primary circuit comprises a feeder circuit, which is coupled to the secondary circuit at the transfer point and is coupled to the generator circuit(s) by means of a second transfer point, wherein a feeder pump lies in the feeder circuit, which conveys a heating or cooling medium in the feeder circuit and forms a further first circulation pump, which is controlled in the same way as the one first circulation pump.

In the same way as the generator side, the secondary circuit can also comprise one or a number (n) of consumer circuit(s) connected in parallel, in which at least one consumer consumes the respective heat or coolness from the heating or cooling medium, and in which an independently controlled consumer pump in series with the respective consumer conveys the heating or cooling medium in the respective consumer circuit. In general, such a pump lies in the flow of the consumer. However, it can also lie in the return flow.

The invention further relates to a pump system that the at least one first circulation pump for conveying a heating or cooling medium in the primary circuit of the heating or cooling system and at least one second circulation pump for conveying a heating or cooling medium in at least one partial area of the secondary circuit coupled to the primary circuit via the transfer point, wherein the pump system is set up for carrying out the method according to the invention.

This means in particular that the pump system is set up to control the volume flow rate of the first circulation pump in functional dependence of the volume flow rate of the secondary circuit behind the transfer point, as is described above and below. This has the advantage that the control function is possible without the involvement of building automation. The pumps to be involved thus preferably cover all necessary (measured) quantities (depending on the design variant more or fewer quantities are required), and communicate these to the at least one first pump to be controlled. This receives the quantities and from this determines itself the volume flow rate to be set according to the mathematical rules described here.

Thus, the invention also relates to a circulation pump for conveying a heating or cooling medium in the primary circuit of the heating or cooling system with a pump electronics system for determining a set point, wherein it is adjusted in its volume flow rate and is configured for it, to calculate a volume flow set point in functional dependence of the volume flow rate of at least one of the other circulation pumps which provide the intended conveying of a heating or cooling medium in the secondary circuit (4) of the heating or cooling system (1).

BRIEF DESCRIPTION OF THE DRAWINGS

Further features and advantages of the method according to the invention are explained in the following with the use of exemplary embodiments and the attached figures. In which.

DETAILED DESCRIPTION OF THE PRESENT EMBODIMENTS

Figure 1:
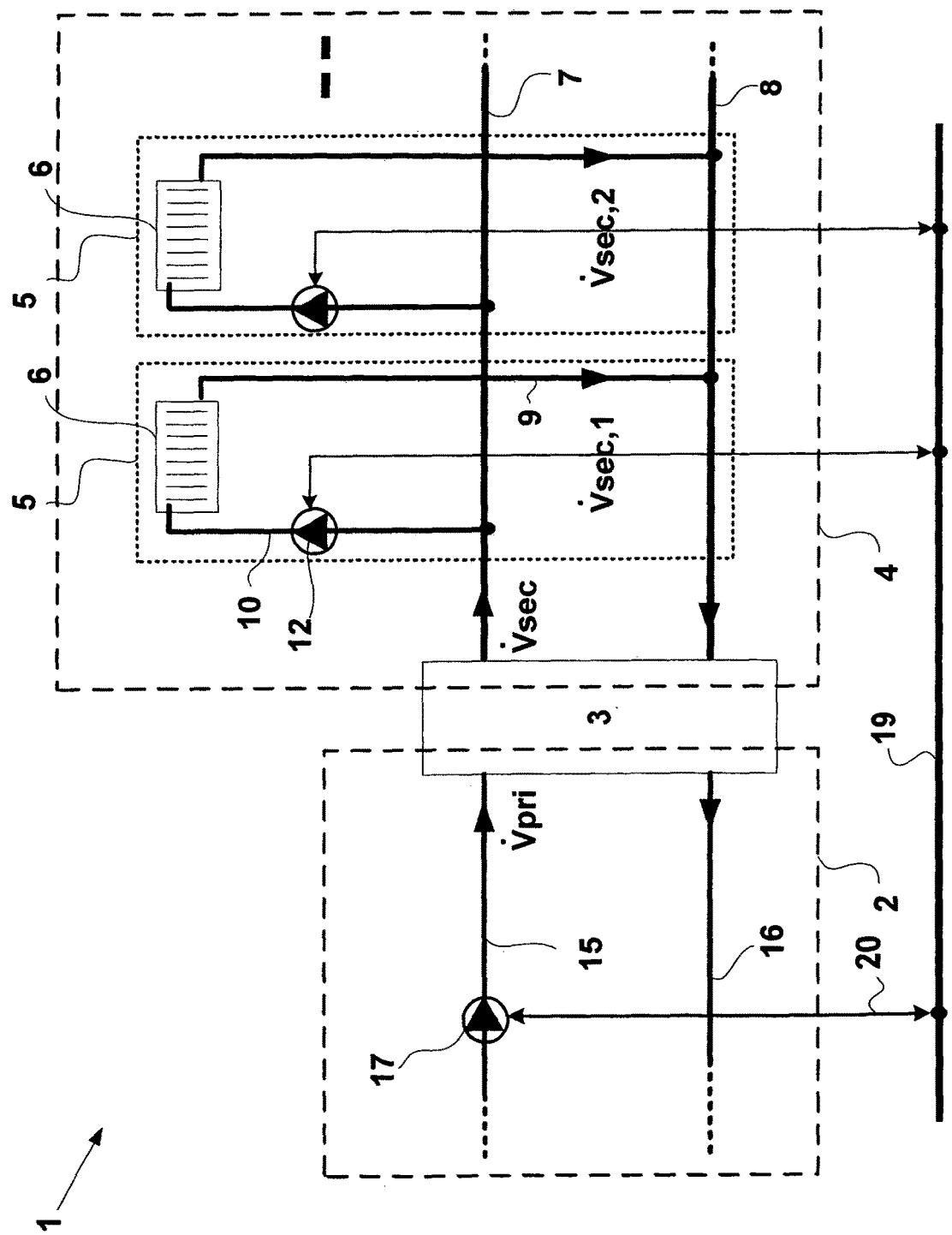
FIG. 1 shows a schematic representation of part of an exemplary heating system with a transfer point to a secondary circuit with more than one consumer circuit.

FIG. 1 shows a section of a heating system 1 with a primary circuit 2 and a secondary circuit 3 which are coupled via a transfer point 3. A first circulation pump 17 to be controlled conveys a heating medium in the primary circuit 2. In the secondary circuit 4 are located two speed-controlled circulation pumps 12 which each belong to a consumer circuit 5 and convey a heating medium in the respective consumer circuit 5. These circulation pumps 12 are connected in parallel in a flow-optimized manner. Thus, the consumer circuits 5 are also connected in parallel. Each consumer circuit 5 thus forms a partial area of the secondary circuit 4 and comprises a local flow 10 and a local return 9. The local flows 10 come from a central secondary flow line 7 which is connected to the secondary side of the transfer point 3. The local returns 9 flow into a central secondary return line 7 which is also connected to the secondary side of the transfer point 3. Inside a consumer circuit 5 are located the consumers 6 and the consumer circuit pump 12 connected in series, wherein the consumer circuit pump 12 is arranged in the local flow 10.

The two thick dashes next to the second or right consumer circuit 5 indicate that the secondary circuit 4 can also comprise further consumer circuits 5. According to a variant not shown, the secondary circuit 4 can also comprise only one consumer circuit 5 so that in this case respectively only one individual second circulation pump 12 is provided. In addition, it should be mentioned that the consumer circuit 5 must not only comprise one individual consumer 6, as is shown in FIG. 1. Rather, any number of consumers 6 can be provided in each consumer circuit 5, which can be connected either in series and/or parallel to one another.

Figure 11:
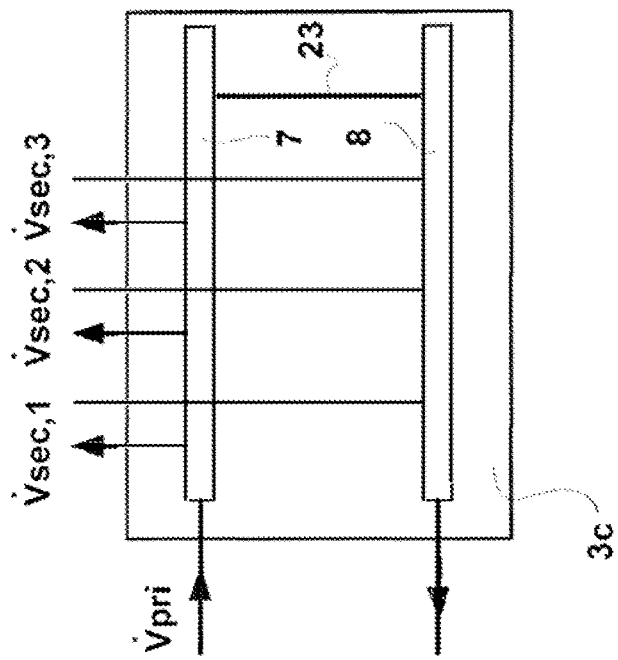
FIG. 11 shows a low-loss distributor as a transfer point.
Figure 10:
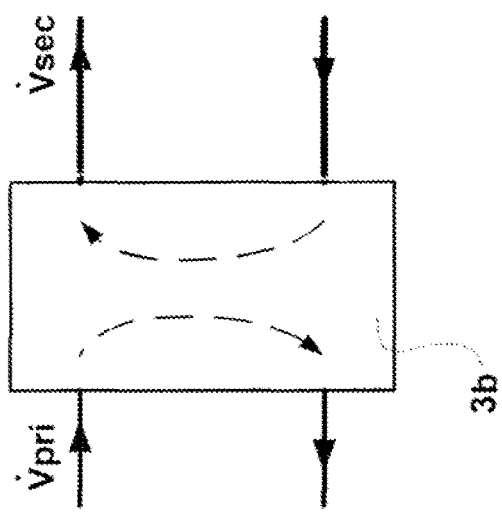
FIG. 10 shows a hydraulic separator as a transfer point.
Figure 9:
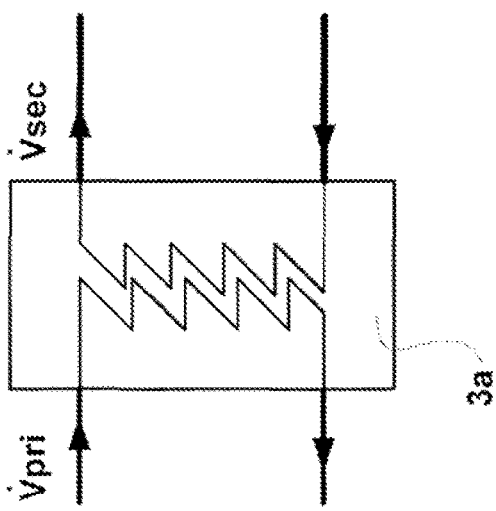
FIG. 9 shows a heat exchanger as a transfer point.

The transfer point 4 can be a heat exchanger 3a (see FIG. 9), a hydraulic separator 3b (see FIG. 10) or a low-loss distributor 3c (see FIG. 11). For transfer through one of these circulation points 3a, 3b, 3c, the volume flow rate $\dot{V}_{pri}$ on the primary side 2 can to a large extent be set without repercussion on the volume flow rate $\dot{V}_{sec}$ on the secondary side 4 because the circuits 2, 4 are hydraulically coupled. With a heat exchanger 3a, no mass transfer takes place between the primary and secondary side so that different heat exchange media can be used in the primary circuit 2 and the secondary circuit 4. In contrast, with a hydraulic separator and a low-loss distributor mass transfer does take place so that the same heat exchange medium inevitably flows on the primary and secondary side of the transfer point 3. With a hydraulic separator 3b, there is a short circuit inside the separator in front of the first of the consumer circuits 5 connected in parallel, see FIG. 10. With a low-pressure distributor 3c, such a short circuit 23 is provided after the last of the consumer circuits 5 connected in parallel which connects the common flow distributor 7 to the common return collector 8 of the consumer circuits 5 behind the branch to the last of the parallel consumer circuits 5, see FIG. 11.

The first circulation pump 17 to be controlled lies in the primary-side central flow line 15 which leads to the primary side of the transfer point 3. On the primary side, a central primary return line 16 further leads away from the transfer point 3. In a flow-optimized manner, the primary-side central return line 16 and the primary-side central flow line 15 are connected in such a way that they convey the same volume flow rate $\dot{V}_{pri}$.

Figure 3:
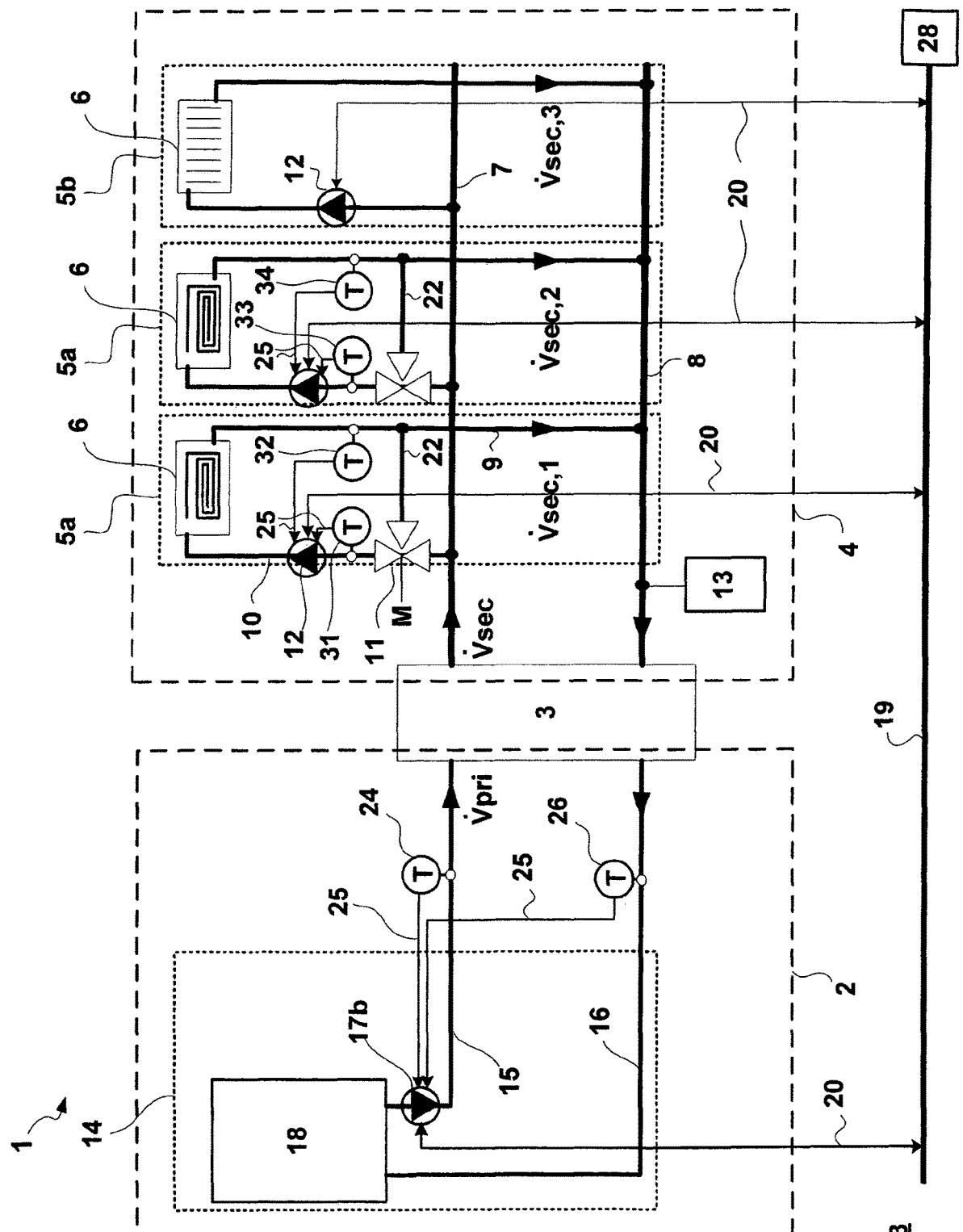
FIG. 3 shows a schematic representation of another exemplary heating system a primary-side generator circuit and more than one secondary-side consumer circuit, with temperature measurement points in the primary circuit and the consumer circuits and with flow mixers in two consumer circuits.
Figure 4:
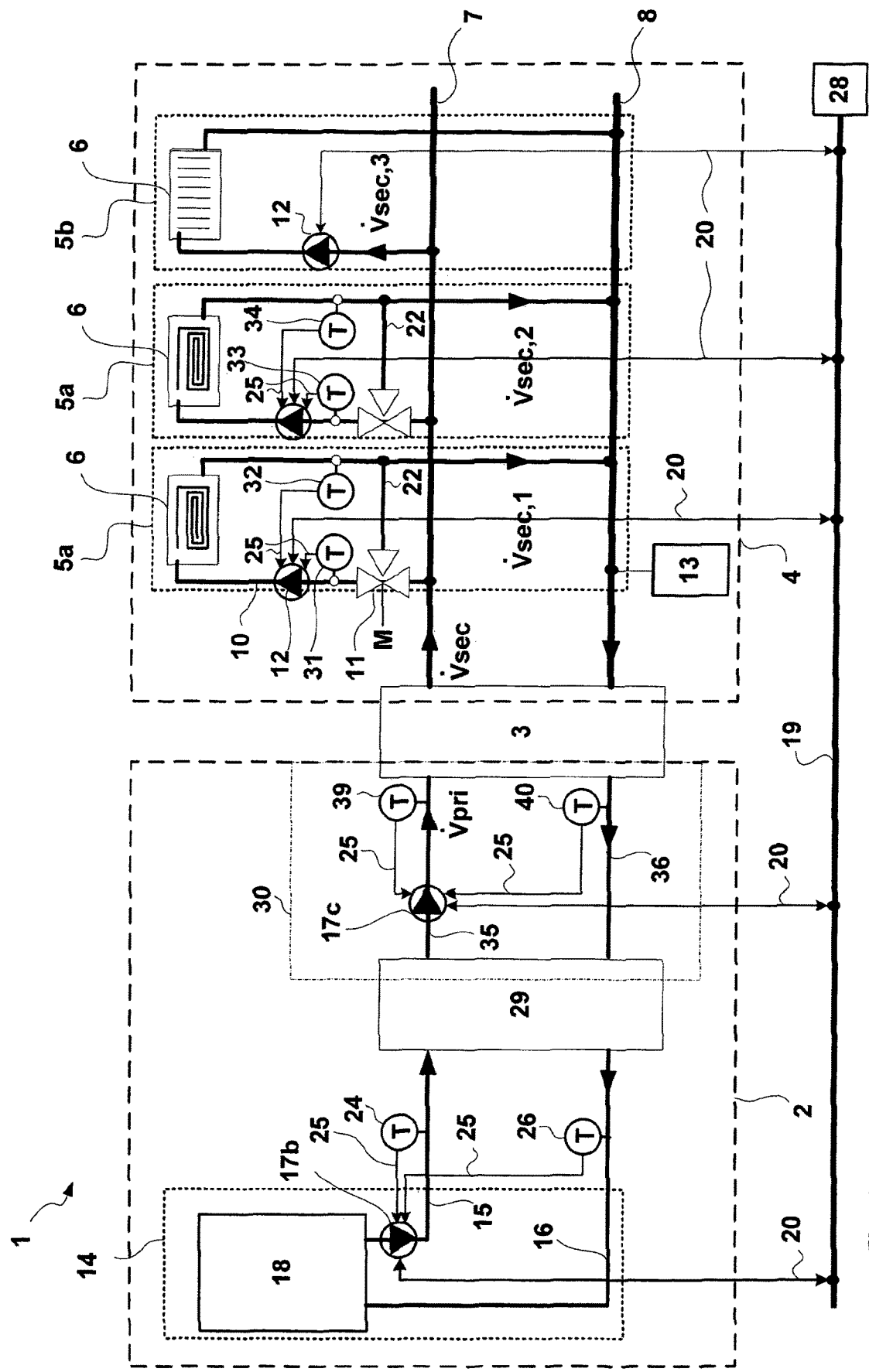
FIG. 4 shows an expansion of the heating system according to FIG. 3 through a feeder circuit between the primary-side generator circuit and the secondary-side consumer circuits.

The first circulation pump 17 can either be a feeder pump 17c, i.e. part of a hydraulically closed feeder circuit 30, as illustrated in FIG. 4, or can be a generator pump 17b, i.e. part of generator circuit 14, as represented in FIGS. 3 and 4.

A volume flow rate $\dot{V}_{pri}$ which corresponds to the conveying flow rate of the first circulation pump 17 to be controlled flows in the central primary-side flow line 15 in front of the transfer point 3. On the secondary side, the secondary volume flow rate $\dot{V}_{sec}$ flows behind the transfer point 3 in the central flow line 7, from which emerge the consumer circuit volume flow rates $\dot{V}_{sec,i}$, i.e. the two sub-flow rates $\dot{V}_{sec,1}$ and $\dot{V}_{sec,2}$. In this design variant, these consumer circuit volume flow rates $\dot{V}_{sec,i}$ correspond to the conveying flow rate of the corresponding consumer circuit pump 12 in the corresponding consumer circuit 5.

It should be noted that the heating system described using the figures can also be a cooling system. Where the terms "heating" and "heat" are used below in relation to this heating system 1, the terms "cooling" and "coolness" apply mutatis mutandis to a cooling system 1.

According to the invention, now the volume flow rate $\dot{V}_{pri}$ of the first circulation pump 17 in functional dependence of the volume flow rate $\dot{V}_{sec}$ of the secondary circuit 4 is controlled behind the transfer point 3. This means that either the volume flow rate $\dot{V}_{sec}$ of the secondary circuit 4 or the set point for conveying flow rate of the first circulation pump 17 is used or such a set point is calculated from the volume flow rate $\dot{V}_{sec}$ of the secondary circuit 4. In the following this is considered mathematically for different system types.

For example, the volume flow rate $\dot{V}_{sec}$ of the secondary circuit 4 can be measured or calculated behind the transfer point 3 and is selected as the set point $\dot{V}_{pri,soll}$ at the first circulation pump 17 or a set point $\dot{V}_{pri,soll}$ for the volume flow rate of the first circulation pump 17 is calculated from the measured or calculated volume flow rate $\dot{V}_{sec}$ of the secondary circuit 4 and is set at the first circulation pump 17.

If the transfer at the transfer point 3 is assumed to be adiabatic, i.e. has no heat loss to the environment, the energy conservation principle between the primary circuit 2 and the secondary circuit 4 applies according to equation (G1):

$$\dot{V}_{pri} \cdot \rho_{pri} \cdot c_{p,pri} \cdot \Delta T_{pri} = \dot{V}_{sec} \cdot \rho_{sec} \cdot c_{p,sec} \cdot \Delta T_{sec} \quad (G1),$$

wherein
$\dot{V}_{pri}$ is the volume flow rate in the primary circuit 2,
$\dot{V}_{sec}$ is the volume flow rate in the secondary circuit 4,
$\rho_{pri}$ is the density of the medium circulating in the primary circuit 2,
$\rho_{sec}$ is the density of the medium circulating in the secondary circuit 4,
$c_{p,pri}$ is the specific heat capacity of the medium circulating in the primary circuit 2,
$c_{p,sec}$ is the specific heat capacity of the medium circulating in the secondary circuit 4,
$\Delta T_{pri}$ is the temperature difference between the flow and return flow temperature on the primary side of the transfer point 3, and
$\Delta T_{sec}$ is the temperature difference between the flow and return flow temperature on the secondary side of the transfer point 3

The difference between the flow and return flow temperature respectively on the primary side $\Delta T_{pri}$ and on the secondary side $\Delta T_{sec}$ is referred to as "spread" or "temperature spread".

In the case of use of a hydraulic separator 3b and a low-loss distributor 3c as the transfer point 3 the same medium flows in the primary circuit 2 and in the secondary circuit 4 as there is a mass transfer between these two circuits. The latter is not the case with a heat exchanger 3a, so that different media can be provided here. Nevertheless, in general here too the same media are used in the primary circuit 2 and the secondary circuit, whereby the construction and maintenance of the system is simplified, as two different heat transfer media or coolants must not be used or held. Predominantly, water or glycol or a mixture of these liquids are used as a heating medium or cooling medium.

With the same media on both sides of the transfer point 3, disregarding the temperature dependence, the specific heat capacities $c_{p,pri}$, $c_{p,sec}$ are equal, and the densities $\rho_{pri}$, $\rho_{sec}$ are equal, so that the corresponding terms from equation 1 can be shortened. This applies according to equation (G2)

$$\dot{V}_{pri} \cdot \Delta T_{pri} = \dot{V}_{sec} \cdot \Delta T_{sec} \quad (G2).$$

When the primary-side (generator-side) volume flow rate $\dot{V}_{pri}$ is adjusted to the secondary-side (consumer-side) volume flow rate $\dot{V}_{sec}$ according to equation G2 the temperature spreads $\Delta T_{pri}$, $\Delta T_{sec}$ on both sides of the transfer point 3 are also equal as $\dot{V}_{pri}$ and $\dot{V}_{sec}$ cancel each other out. In the sense of the control function according to the invention, this can be understood as an optimal control as the generator circuit firstly does not deliver more volume flow rate than is required for the consumer, secondly when heating it does not deliver a higher flow temperature than reaches the consumers (when cooling it does not deliver a lower flow temperature than reaches the consumers), and thirdly when heating it does not receive a higher return flow temperature than comes back from the consumers (when cooling it does not receive a lower return flow temperature than is returned from the consumers).

In an (ideal) hydraulic separator 3b (FIG. 10) in this state no mixing process takes place. In the bypass 23 of a low-pressure distributor 3c (FIG. 11), no overflow also takes place in this state. With transfer by means of a counter-current heat exchanger 3a (FIG. 9) the same "driving temperature difference" $T_{treib} = T_{pri\_VL} - T_{sec\_VL} = T_{pri\_R} - T_{sec\_RL}$ prevails between the primary side (pri) and secondary side (sec) as well as in the flow (VL) and return flow (RL) and thus in the entire area of the heat transfer surface.

From equation G2 there are two possible mass quantities in order to control the speed of the primary-side circulation pump 17 in such a way that the primary volume flow rate $\dot{V}_{pri}$ is approximated to the demand. Either via the temperature spread $\Delta T_{pri}$ in the primary circuit 2, which is to be approximated to the temperature spread $\Delta T_{sec}$ in the secondary circuit 4, or via the primary-side volume flow rate $\dot{V}_{pri}$, which is to be approximated to the secondary-side volume flow rate $\dot{V}_{sec}$.

However, control of the temperature spread $\Delta T_{pri}$ in the primary circuit 2 has the disadvantage that due to the heat capacities disturbing dead times are present in the controlled system. Therefore, according to the invention control of the primary-side volume flow rate $\dot{V}_{pri}$ is proposed. How this conceptually takes place is initially illustrated with reference to FIG. 1.

According to the first example shown in FIG. 1, the primary circuit 2 comprises a centrifugal pump 17 to be controlled, the secondary circuit 4 comprises two or more controlled, flow-optimized parallel conveying consumer circuit pumps 12. The primary-side centrifugal pump 17 can be a feeder pump 17c which due to a too great distance between the generator circuit(s) and consumer circuits 5a and the associated hydraulic resistances in the pipeline system conveys the heat exchange medium to the transfer point 3 to the consumer circuits 5a. However, the primary-side centrifugal pump 17 can also be a generator pump 17b.

If the above-mentioned optimal control is required, i.e. $\Delta T_{pri} = \Delta T_{sec}$, equation G1 is simplified to $$\dot{V}_{pri} \rho_{pri} c_{p,pri} = \dot{V}_{sec} \rho_{sec} c_{p,sec} \tag{G3}$$

For the volume flow rate control of the primary-side centrifugal pump 17 its current conveying flow rate $\dot{V}_{pri,ist}$ is used as the actual value. This can either be directly measured inside or outside of the centrifugal pump 17, for example by means of a volume flow rate sensor or is calculated or estimated from other physical quantities. A calculation can, for example, be made from the differential pressure generated by the pump and the pump speed. An estimation can be made on the basis of model equations for the mechanical-hydraulic pump motor model, optionally taking into account the electric-mechanical motor model, as is usually the case with control-technical observers.

Thus, equation G3 is converted to the primary-side volume flow rate $\dot{V}_{pri}$. Thus, for the corresponding set point of the volume flow rate control $\dot{V}_{pri,soll}$ the following applies:

$$\dot{V}_{pri,soll} \stackrel{!}{=} \dot{V}_{sec} \frac{\rho_{sec} \cdot c_{p,sec}}{\rho_{pri} \cdot c_{p,pri}}. \tag{G4}$$

Thus, it is apparent that with the same media on the primary 2 and secondary side 4 of the transfer point 3 the demand for the equality of the volume flows results, i.e. $\dot{V}_{pri,soll} = \dot{V}_{sec}$ applies. With different media, however, the secondary-side total volume flow rate $\dot{V}_{sec}$ is to be weighted by a factor k which describes the product of the density ratio and heat capacity ratio. Thus $$\dot{V}_{pri,soll} = k \cdot \dot{V}_{sec} \text{ applies with } k = \frac{\rho_{sec} \cdot c_{p,sec}}{\rho_{pri} \cdot c_{p,pri}}. \tag{G5}$$

or in terms of functional dependence $$\dot{V}_{pri,soll} = a \cdot k \cdot \dot{V}_{sec} + b \text{ applies with } k = \frac{\rho_{sec} \cdot c_{p,sec}}{\rho_{pri} \cdot c_{p,pri}}, \tag{G5a}$$

wherein the coefficient a describes a linear dependence of the two volume flow rates and the coefficient b describes an offset.

Now it should be noted that according to FIG. 1 on the secondary side more than one consumer circuit 5 is provided so that there is a consumer circuit-specific sub-flow. The total volume flow rate $\dot{V}_{sec}$ in the secondary 4 therefore corresponds to the sum of all n consumer circuit volume flow rates $\dot{V}_{sec,1}, \dot{V}_{sec,2}, \ldots, \dot{V}_{sec,n}$ which can mathematically simply be added together.

$$\dot{V}_{sec} = \sum_{1}^{n} \dot{V}_{sec,i}. \tag{G6}$$

The consumer circuit volume flow rates $\dot{V}_{sec,1}, \dot{V}_{sec,2}, \ldots, \dot{V}_{sec,n}$ can either be directly measured, calculated or estimated inside or outside of the consumer circuit pumps 12, as was done above at the primary-side centrifugal pump.

Against this background, the central concept of the method according to the invention is to control the primary-side centrifugal pump 17 in such a way that the sum of the consumer circuit volume flow rates weighted by the factor k, in particular the flow-optimized parallel conveying consumer circuit pumps 12 in the secondary circuit 4 if necessary multiplied by the predetermined ratio value a and/or added to the predetermined offset b, wherein in particular in the case of the same media being used the factor k=1.

The consumer circuit volume flow rates $\dot{V}_{sec,1}, \dot{V}_{sec,2}, \ldots, \dot{V}_{sec,n}$ can be determined from independent volume flow rate measuring devices or from volume flow rate sensors inside the consumer circuit pumps 12. Independent volume flow rate measuring devices have the advantage that they can be installed at any point inside a consumer circuit 5. This is a particular advantage if recirculation is present in the consumer circuit 5 and the consumer pumps 12 convey the volume flow rate through the consumer 6, but not the lower consumer circuit volume flow rate that will still be illustrated in the following.

In contrast, however, determining the consumer circuit volume flow rates through the consumer circuit pumps has the advantage that additional, external measurement technology for measuring the volume in the consumer circuits are avoided. Thus, additional power supply is also not required for such external measurement technology and additional communication lines for transmission of the measurement data, whereby the installation and maintenance efforts and costs are kept to a minimum. In general, modern electronically controlled circulation pump units determine the conveying flow rate Q for their control, for operating point recognition and/or for other additional functions such as risk analysis so that a corresponding measurement technology and/or software-based determination method is already available in the pump electronics system. Ideally, such pump units are used with integrated volume flow rate determination as consumer pumps 12.

Furthermore, it is advantageous if the centrifugal pump 17 to be controlled automatically determines the set point for its volume flow control in its pump electronics system on the basis of the consumer circuit volume flow rates $\dot{V}_{sec,i}$. Thus, the determined consumer circuit volume flows $\dot{V}_{sec,i}$ are communicated to the centrifugal pump to be controlled. In this design variant, an evaluation unit is integrated into the pump electronics system of the primary-side centrifugal pump 17 which calculates the primary-side set volume flow rate $\dot{V}_{pri,soll}$ from the consumer circuit volume flow rates $\dot{V}_{sec,1}, \dot{V}_{sec,2}, \ldots, \dot{V}_{sec,n}$ according to equations G5 and G6 optionally calculated with a predetermined factor k, as long as the same media are not present. However, in the pump electronics system of the pump 17 to be controlled, this factor k can also be preset by default as k=1 so that with commissioning in the case of the same media on both sides of the transfer point 3 no further setting or provision for k must be carried out.

The transmission of the consumer circuit volume flow rates s, can advantageously be carried out directly from the respective measurement point on the primary-side centrifugal pump, i.e. for example, from the independent volume flow rate devices or from The individual consumer circuit pumps 12.

According to an alternative variant, the determining of the set volume flow rate $\dot{V}_{pri,soll}$ according to equations G5 and G6 from the consumer circuit volume flow rates $\dot{V}_{sec,i}$ can also be carried out in an external evaluation unit 28, for example in a central communication device 28 which on the one hand is in communication with the consumer circuit pumps 12 in order to determine or request the consumer circuit volume flow rates $\dot{V}_{sec,i}$ of these, and on the other hand is in communication with the primary-side pump 17 to be controlled in order to communicate the set volume flow rate $\dot{V}_{pri,soll}$ to be communicated. The same applies for any possible provision of the weighting factor k of the external evaluation unit.

For data transmission, the volume flow measuring devices and/or consumer circuit pumps 12 comprise suitable communication interfaces in order to transmit the consumer circuit volume flow rate data. Today, modern pump units already have communication interfaces such as CAN, LON, BACnet, Modbus, LAN, etc., available so that no additional communication units are required in order to transfer the volume flow rate data to the pump to be controlled. Radio modules are also well known in pump units. In the figures, wired communication by means of data cables is illustrated that are connected to the data network 19, to which the primary-side centrifugal pump 17 is also connected.

Figure 2:
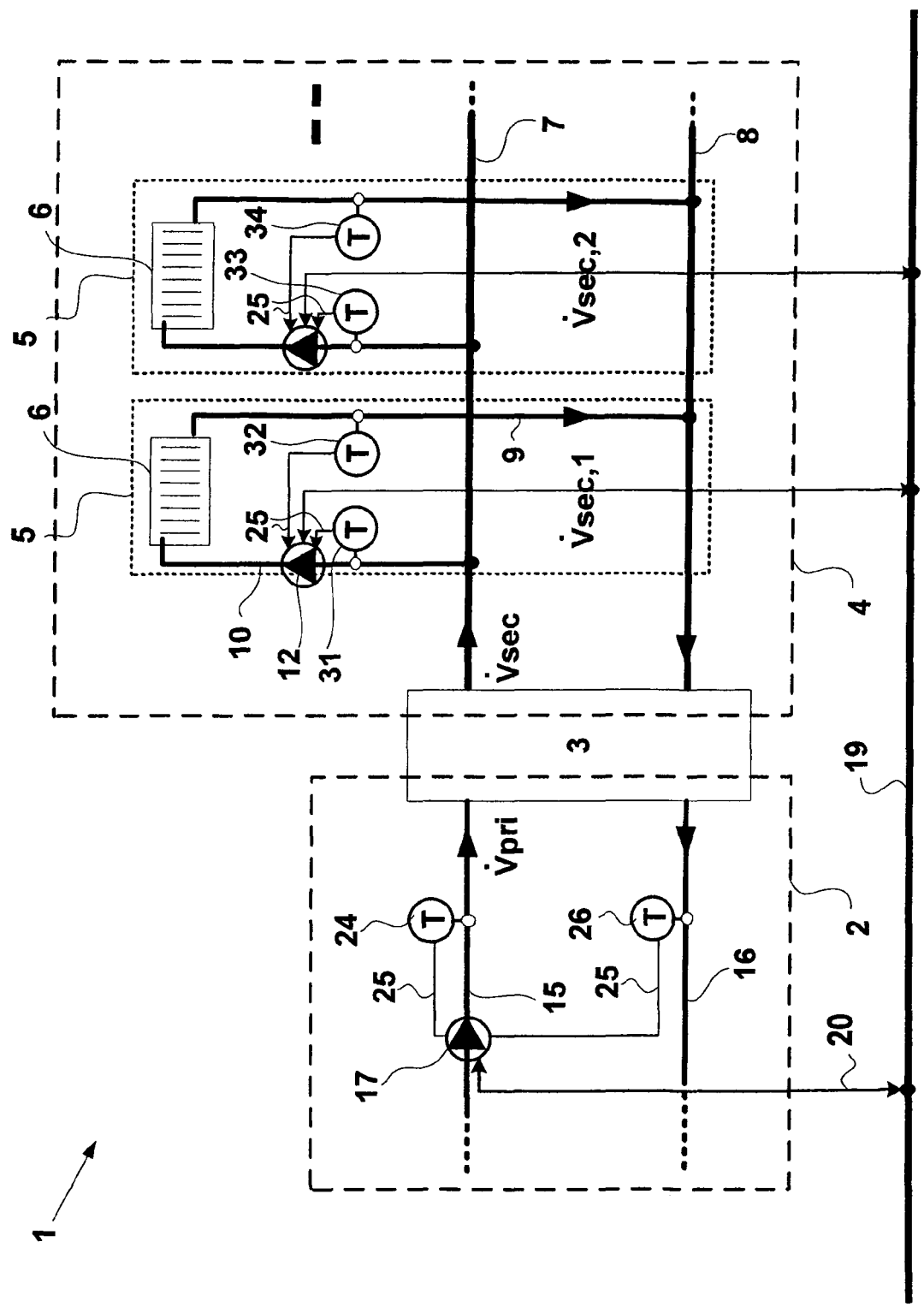
FIG. 2 shows a heating system according to FIG. 1 with additional temperature measurement points in the primary circuit and the consumer circuits.

As already mentioned, there are heating and cooling systems in which a consumer circuit volume flow rate $\dot{V}_{sec,i}$ is not identical to the consumer flow rate $\dot{V}_{consumer,i}$ of the consumer circuit pump 12 arranged in the corresponding consumer circuit. For example, it is customary in heating technology to provide each individual consumer circuit 5a with an individually reduced flow temperature by adding return flow liquid to the local return line 9. This is the case for underfloor heating, for example. As illustrated in FIG. 2, for this purpose, in the corresponding consumer circuit 5a a flow mixer 11, configured in FIG. 2 in the form of a three-way control valve, is provided, which is arranged in the local flow line 10 of the consumer circuit 5a and connected to the local return line 9 via a mixing line 22. The flow mixer 11 can be motorized, in particular be temperature controlled autonomously to obtain a predetermined flow temperature TVL,sec,i in the corresponding consumer circuit 5a.

Through the use of a mixer 11 in a consumer circuit 5a to admix local return flow liquid into the local flow 10, the sum of the volume flow rates conveyed by the consumer circuit pumps 12 is greater than the volume flow rates provided by the transfer point 3 or the volume flow rate $\dot{V}_{sec}$ flowing back to the transfer point 3.

This is not a problem as long as a consumer circuit volume flow rate $\dot{V}_{sec,i}$ is determined in the slow direction in front of the mixer 11 in the local flow line 10 or in the local return line 9 behind the branch to the mixer line 22. This is essentially possible with a pump-independent volume flow rate measuring device, since it can be arranged at any location in the consumer circuit 5a. However, if the consumer circuit volume flow rate determining is carried out through the consumer circuit pumps 12 because it has the necessary means anyway, this is not immediately possible if the consumer circuit pumps, when behind the mixer 11 or said branch in the flow direction, as is the case in FIG. 2. In this case, the determined consumer volume flow rates $\dot{V}_{consumer,i}$ can not be added directly. In order to then make addition possible, a compensation of the determined consumer volume flow rates $\dot{V}_{consumer,i}$ can be carried out. With reference to the example in FIG. 2, this would be necessary for the left and the center consumer circuits 5a as these each comprise a mixer 11.

Thus, according to an advantageous further development of the method according to the invention, a compensation of each volume flow rate $\dot{V}_{consumer,i}$ determined by the consumer circuit pumps 12 can be carried out through multiplication with a consumer circuit-specific compensation value Ci. This compensation value Ci is preferably formed from the ratio of the temperature difference between the local flow behind the mixer 11 and the local return flow 9 of the corresponding consumer circuit 5a to the temperature difference between the central secondary-side flow 7 and the local return flow 9 of the corresponding consumer circuit 5a. Alternatively, instead of the central secondary-side flow temperature, the primary-side flow temperature can be used. This has the advantage that no additional measuring technology is required for measuring the secondary-side flow temperature. Rather, it is possible to fall back on measuring technology for the detection of the temperatures which is integrated in the centrifugal pumps or is at least partially integrated.

Thus, suitably, the temperatures in the local flow 10 of the consumer circuit 5a behind the mixer 11, in the local return flow 8 and in the primary flow 15 can be measured and used to calculate the compensation value $C_i$ for this consumer circuit 5a according to the aforementioned ratio. The detection of the temperature in the local flow 7 can be carried out by means of a first temperature sensor 31, 33 (see FIGS. 2-4) which is arranged outside of the consumer circuit pump 12. Alternatively, however, it can be integrated into this and measure the temperature of the conveying flow, as the consumer circuit pump is arranged in the flow line 10 anyway so that the conveying medium temperature is the flow temperature. The detection of the temperature in the local return flow 9 can be carried out by means of a second temperature sensor 32, 34 (see FIGS. 2-4) which is arranged outside of the consumer circuit pump 12. If, however, the consumer circuit pump 12 is arranged in the return flow of the consumer circuit 5a, the second temperature sensor can be integrated in this pump 12 and detect the conveying medium temperature. Finally, the detection of the temperature in the primary central flow 15 is carried out by means of a third temperature sensor 24 (see FIGS. 2-4) which can be arranged outside of the pump 17 to be controlled in the central secondary-side flow 7 or outside of the pump 17 to be controlled in the primary-side flow 15 (see FIGS. 2-4) or inside the pump 17 to be controlled in the primary-side flow 15.

According to the design variant in FIG. 2, the first and the second temperature sensor 31, 32 can be in communication with the consumer circuit pump 12 of the corresponding consumer circuit 5a and transmit the temperature values to the pump electronics system of this consumer circuit pump 12. This can be carried out with pump-integrated or pump-external sensors either wired via sensor lines 25 or via radio. The consumer circuit pump 12 then transmits the temperature measurement values onto the primary-side pump 17 to be controlled in the pump electronics system of which the compensation value is calculated.

However, according to an alternative design variant, the temperature sensors can also comprise their own communication interfaces with corresponding ability to communication and be connected to the data network 19 via radio or wires. This allows a direct supply of the temperature measurement values to the pump 17 to be controlled so that with regard to the data transfer no detour via the consumer circuit pumps 12 must be carried out.

In the same way, according to the design variant in FIG. 2, the third temperature sensor 24 can be in communication with the primary-side centrifugal pump 17 to be controlled and transmit the temperature measurement values to its pump electronics system. This can be carried out with a pump-integrated or pump-external sensor either wired via a sensor line 25 or via radio.

The primary-side pump 17 to be controlled thus obtains measurement values from all three temperature sensors 24, 31, 32 or 24, 33, 34 and can calculate the consumer circuit-specific compensation value $C_i$ by dividing the difference between the local flow and return flow temperatures by the difference between the central flow and the local return flow temperatures.

It should be noted that it is not absolutely necessary for the primary-side pump 17 to be controlled to perform the calculation of the compensation value $C_i$. Rather, this can also be carried out in one of the consumer pumps, so that they provide the correct consumer circuit volume flow rate. In this case, the temperature measurement values must be transmitted to the corresponding consumer circuit pump 12, i.e. the central flow temperature to all consumer circuit pumps 12. This can be carried out in a wired manner via the data network 19 or via radio. Furthermore, it may be performed by the pump 17 to be controlled or by the third temperature sensor.

According to a further alternative, the calculation of the compensation value $C_i$ can be carried out in the central evaluation unit which provides the set volume flow rate for the primary-side pump to be controlled. Corresponding to the above-mentioned possibilities, the temperature measurement values are then to be transmitted to this central evaluation unit.

The temperature measurement in the local flow 10, local return flow 9 of the consumer circuit 5a and the primary flow 15 has the advantage that it is possible to make extensive use of measuring technology available in the pumps, i.e. in principle, additional self-sufficient external temperature measurement technology can be dispensed with, in order to determine the respective compensation value $C_i$. Ideally, the respective medium temperature corresponds to the flow temperature, at least if the corresponding pump is in the flow. If the consumer circuit pump 12 is integrated in the local flow 10, it determines the corresponding flow temperature. If it is integrated in the return flow 9, it measures the corresponding return flow temperature. The second temperature sensor 34 connected to the respective consumer circuit pump 12 is then to be integrated in the corresponding other flow path.

If, instead of the primary-side flow temperature, the central secondary-side flow temperature is used to determine the compensation value $C_i$, the third temperature sensor is to be arranged in the central secondary-side flow 7. However, the communication connection in this case may be difficult because the primary-side pump 17 to be controlled and the consumer circuit pump can be far away from the measuring point in the central secondary flow 7 at far extending heating systems 1. Thus, here it is an advantage to equip the third temperature sensor with is own communication unit and to connect it to the data network 19.

The thinking behind the determination of the compensation value $C_i$ is illustrated in the following.

As the heat flow $\dot{Q}$ via the mixer 11 does not change, i.e. $\dot{Q}_{sec,i}=\dot{Q}_{consumer,i}$, it can be determined from the temperature differences (spread) before and after the mixer 11 of the compensation value $C_i$, by means of which the consumer circuit volume flow $\dot{V}_{sec,i}$ in front of the mixer 11 can be calculated from the consumer volume flow $\dot{V}_{consumer,i}$ behind the mixer 11. The compensation value $C_i$ can correspond to the ratio of the above-mentioned temperature differences. Thus, according to equation 7:

$$\dot{V}_{sec,i} = C_i \cdot \dot{V}_{consumer,i} \text{ applies with } C_i = \frac{\Delta T_{consumer,i}}{\Delta T_{sec,i}}. \tag{G7}$$

wherein $\dot{V}_{sec,i}$ is the consumer circuit volume flow rate flowing into the ith consumer circuit 5a (volume flow rate in front of the mixer 11), $\dot{V}_{consumer,i}$ is the consumer volume flow rate flowing in the ith consumer circuit 5a through the consumer or consumers 6 (volume flow rate behind the mixer 11), $\Delta T_{consumer,i}$ is the temperature difference between the flow 10 and return flow 9 after the mixer 11 in the ith consumer circuit, and $\Delta T_{sec,i}$ Is the temperature difference between the flow 10 and return flow 9 before the mixer 11 in the ith consumer circuit.

In order to determine the compensation factor $C_i$, temperature measurement can take place at four points of the consumer circuit 5a, namely before ($T_{VL,sec,i}$) and after ($T_{VL,consumer,i}$) the mixer 11 in the local flow line 10 and before ($T_{RL,consumer,i}$) and after ($T_{RL,sec,i}$) the branch to the bypass 22 in the local return line 9 so that the following applies:

$\Delta T_{consumer,i}=T_{VL,consumer,i}-T_{RL,consumer,i}$ and $$\Delta T_{sec,i}=T_{VL,sec,i}-T_{RL,sec,i} \tag{G8}$$

However, for the calculation of the compensation factor C the following knowledge is used, the observation of which reduces measuring efforts:

On the one hand, for the temperature difference $\Delta T_{sec,i}$ in front of the mixer 11 the same return flow temperature applies as for the temperature difference $\Delta T_{consumer,i}$ behind the mixer 11, $T_{RL,consumer,i}=T_{RL,sec,i}$, as the temperature through the branch of the local return line 9 into the mixer line 22. Thus, a single temperature measurement in the local return line 9 is sufficient, but this must be carried out for each consumer circuit 5a with a flow mixer 11.

On the other hand, the flow temperature $T_{VL,sec,i}$ in front of the mixer 11 is the same for all consumer circuits 5a so that instead of consumer circuit-related temperature measurements in the local flows 10 in front of the mixer 11 the central flow temperature $T_{VL,sec}$ can be used, $$T_{VL,sec,1}=T_{VL,sec,2}=T_{VL,sec} \tag{G9}$$

Taking account of these relationships, the consumer-specific compensation value $C_i$ can be determined as follows:

$$C_i = \frac{T_{VL,consumer,i} - T_{RL,consumer,i}}{T_{VL,sec} - T_{RL,consumer,i}}. \tag{G10}$$

When using a hydraulic separator 3b or a low-pressure distributor 3c as the transfer point 3, on the assumption of idealized conditions, it can further be assumed that the flow temperature through the separator 3b and the distributor 3c remains the same, at least insofar as and as long as the primary mass flow $\dot{V}_{pri}$ is greater than or equal to the secondary mass flow $\dot{V}_{sec}$. Thus $T_{VL,sec}=T_{VL,pri}$ applies. With this assumption, instead of the secondary-side flow temperature $T_{VL,sec}$, the primary side flow temperature is used. This has the advantage that no additional measuring technology must be arranged in the secondary flow for temperature measurement, as long as suitably the primary-side pump 17 to be controlled is equipped with a pump electronics system processing temperature values, as is already the case today with modern centrifugal pumps. This can then take over the task of the measuring electronics and make an evaluation. If the centrifugal pump 17 to be controlled is additionally arranged in the flow of the primary circuit, instead of an external temperature sensor, a pump-integrated temperature sensor can be used which determines the temperature of the medium.

Taking into account the assumptions made, the secondary-side total volume flow rate $\dot{V}_{sec}$ results from the addition of the compensated consumer flow rates $\dot{V}_{consumer,i}$, but the compensation only has to take place where mixers 11 are in the load circuits 5a.

$$\dot{V}_{sec} = \sum_1^n \left( \dot{V}_{consumer,i} \cdot C_i \right) \text{ with.} \tag{G11a}$$

$$C_i = \frac{T_{VL,consumer,i} - T_{RL,consumer,i}}{T_{VL,pri} - T_{RL,consumer,i}}. \tag{G11b}$$

Thus, the calculation of the primary set volume flow rate is preferably carried out using equations G5 and G11a and b.

In the case of the example shown in FIG. 2, the following applies $$\dot{V}_{sec} = \dot{V}_{consumer,1} \cdot C_1 + \dot{V}_{consumer,2} \cdot C_2 + \dot{V}_{sec,3}. \tag{G12}$$

If the idealized consideration of the transfer point 3 to be replaced by a realistic consideration, a temperature drop $\Delta T_{pri-sec}$ between the primary-side flow 15 and the secondary-side central flow 7 is to be considered:

$$T_{VL,sec}=T_{VL,pri}-\Delta T_{pri-sec} \tag{G13}.$$

Thus, in a further development of the method according to the invention the calculation of the consumer-specific compensation value Ci in G11b is replaced by G14:

$$C_i = \frac{T_{VL,consumer,i} - T_{RL,consumer,i}}{T_{VL,pri} - \Delta T_{pri-sec} - T_{RL,consumer,i}}. \tag{G14}$$

With real, generously dimensioned hydraulic separators 3b, in the case of volume flow adjustment, mixing takes place in the separator 3b, in which the temperature drops from the primary side to the secondary side by the same amount in the flow as in the return flow. The same applies for the driving temperature difference in the heat exchanger 3a and the low-loss distributor 3c.

If the temperature drop is not taken into account, the result for equation 11 is too low a value for the secondary volume flow rate $\dot{V}_{sec}$ because the spread is overestimated. Thus, too low a primary volume flow rate $\dot{V}_{pri}$ would also be controlled. In the hydraulic separator 3b, the temperature would then be mixed down by the larger secondary volume flow rate and the consumers 6 would be undersupplied.

Often, even with at least one heating circuit no mixer is installed, so that the temperature drop can be measured continuously.

The temperature drop $\Delta T_{pri-sec}$ is preferably determined in that in a consumer circuit 5b without a mixer (FIG. 2) the difference between the primary flow temperature $T_{VL,pri}$ and the secondary local flow temperature $T_{VL,sec,i}$ is calculated in this (ith) consumer circuit 5b:

$$\Delta T_{pri-sec}=T_{VL,pri}-T_{VL,sec,i} \tag{G15}.$$

In a consumer circuit 5b without a mixer, the secondary flow temperature $T_{VL,sec}$ is the same as the temperature $T_{VL,sec,i}$ in the local flow 10 of the consumer circuit 5a: $T_{VL,sec}=T_{VL,sec,i}$, so that it is not necessary to measure this secondary flow temperature $T_{VL,sec}$. Rather, the existing measuring point can be used for this. This means that in a consumer circuit without a mixer 5b, as is shown in FIG. 2 at the very right, for example, each time the temperature drop $\Delta T_{pri-sec}$ can be measured via the transfer point 3 in the flow 15, 10.

Alternatively or additionally, the temperature drop $\Delta T_{pri-sec}$, can be determined at a return flow medium in the flow-mixing consumer circuit 5a, in which with a completely opened mixer 11, i.e. in the absence of admixing of return medium in the local flow, the difference between the primary flow temperature $T_{VL,pri}$ and the secondary local flow temperature $T_{VL,consumer,i}$ behind the mixer 11 is calculated in this consumer circuit 5a:

$$\Delta T_{pri-sec}=T_{VL,pri}-T_{VL,consumer,i}, \text{ with a completely opened mixer} \tag{G16}.$$

With a completely opened mixer 11, the secondary flow temperature $T_{VL,sec}$ at the measuring point is in the local flow 10 of the consumer circuit 5a behind the mixer 11 $T_{VL,sec}=T_{VL,consmer,i,open\ valve}$, so that it is not necessary to measure this secondary flow temperature $T_{VL,sec}$, but the existing measuring point can be used for this purpose. This means that as soon as a mixer 11 is completely opened, the temperature drop $\Delta T_{pri-sec}$ is measured via the transfer point 3 in the flow 15, 10.

However, this must not be carried out continuously. It is sufficient that the temperature drop $\Delta T_{pri-sec}$ is calculated and saved at least once. As this calculation is based on measured values, which are already available together at one of the evaluation points, i.e. preferably in the primary centrifugal pump to be controlled, alternatively, in the respective consumer circuit pump 12 or in the central evaluation unit, the information is only needed when the mixer is completely opened. If this information is available, the temperature drop $\Delta T_{pri-sec}$ is calculated from the difference of the present flow temperatures $T_{VL,pri}$ and $T_{VL,consumer,i}$.

The provision of the information can take place, for example, via a corresponding opening signal from the mixer 11. The opening signal can be transmitted to the corresponding evaluation point via wires or radio. For this purpose, a corresponding signal line provided between the evaluation point and the mixer 11 can exist, or the mixer 11 has a communication unit which allows its connection to the data network 19.

Preferably, the determination of the temperature drop $\Delta T_{pri\text{-}sec}$ is carried out repeatedly at intervals, in particular every time the mixer 11 is completely opened. This has the advantage that compensations and averaging of the temperature drop $\Delta T_{pri\text{-}sec}$ are possible.

At this point it should be added that insertion of G15 into G14 leads to a compensation value $C_i=1$, i.e. when the mixer is completely opened mathematically no correction of the determined consumer volume flow rate $\dot{V}_{consumer,i}$ is required because it corresponds to the consumer circuit volume flow rate $\dot{V}_{sec,i}$. Correspondingly, in G11 for n=3 in FIGS. 2, 3 and 4 $C_3=1$ is set and not listed in G12.

As the temperature drop $\Delta T_{pri\text{-}sec}$ is the same as the temperature drop across the return flow, according to an alternative design variant, the temperature drop $\Delta T_{pri\text{-}sec}$ can be determined in the return flow instead of in the flow. The same applies as for equation 15:

$$\Delta T_{pri\text{-}sec} = -\Delta T_{sec\text{-}pri} = -(T_{RL,sec} - T_{RL,pri}) \tag{G17}$$

For this purpose, however, the primary-side return flow temperature $T_{RL,pri}$ additionally has to be measured by means of a fourth temperature sensor 26. The central secondary-side return flow temperature $T_{RL,sec}$ in the secondary circuit can be calculated according to the $$T_{RL,sec} = \frac{\sum (\dot{V}_{sec,i} \cdot T_{RL,sec,i})}{\sum \dot{V}_{sec,i}}. \tag{G18}$$

mixing rule. The consumer-specific return flow temperatures $T_{RL,sec,i}$ are known due to their measurement by means of the second temperature sensor 34 and the consumer circuit-specific volume flow rates $\dot{V}_{sec,i}$ are determined according to equations G6, G7 or G11a.

According to the invention, the return flow temperature $T_{RL,pri}$ is now also measured in the primary circuit 2 so that all quantities in equation G17 are known and these can be used to calculate the temperature drop.

If a heat exchanger 3a is used as the transfer point 3, the media circulating in the primary circuit 2 and the secondary circuit 4 can change. According to equation G5, with this difference in media, the weighting factor k is not equal to 1. As the heating/cooling medium or media to be used is/are determined when designing the heating or cooling system, its/their density(ies) and specific heat capacity(ies) are also known in principle and can be the volume flow control of the primary-side pump 17 as such or in the form of the weighting factor k already calculated according to equation G5.

Alternatively, according to the invention automatic determination of the weighting factor k can also be carried out for this purpose. As the heat flow rate on the primary and secondary side must be the same (adiabatic delivery) following from G1:

$$\frac{\rho_{sec} \cdot c_{p,sec}}{\rho_{pri} \cdot c_{p,pri}} = k = \frac{\dot{V}_{pri} \cdot \Delta T_{pri}}{\dot{V}_{sec} \cdot \Delta T_{sec}}. \tag{G19}$$

Thus, the temperature spread $\Delta T_{pri}$ and the volume flow rate $\dot{V}_{pri}$ are determined, in particular measured, on the primary side 2 of the transfer point 3, as previously described in detail with reference to the various possibilities. Thus, the primary-side volume flow rate $\dot{V}_{pri}$ is preferably calculated from one of the volume flow rate sensors integrated in the pump 17 to be controlled, or from other quantities inside the pump 17. The third 24 and fourth 36 temperature sensors can serve to determine the temperature spreads, wherein preferably the pump electronics system of the primary-side pump 17 to be controlled determines the difference from these sensor values.

The volume flow rate $\dot{V}_{sec}$ on the secondary side 4 can according to the invention be calculated according to one of the previously described equations G6, G7 or G11a.

In addition, the spread $\Delta T_{sec}$ on the secondary side 4, i.e. the difference between the secondary-side flow temperature $T_{VL,sec}$ and the secondary-side return flow temperature $T_{RL,sec}$ can be calculated.

$$\Delta T_{sec} = T_{VL,sec} - T_{RL,sec} \tag{G20}$$

The secondary-side return flow temperature $T_{RL,sec}$ is thus preferably determined from the mixing rule according to equation G18. The secondary-side flow temperature $T_{VL,sec}$ can be calculated from the primary-side flow temperature $T_{VL,pri}$ and the temperature drop $\Delta T_{pri\text{-}sec}$ over the transfer point 3.

$$T_{VL,sec} = T_{VL,pri} - \Delta T_{pri\text{-}sec} \tag{G21}$$

As the primary-side flow temperature $T_{VL,pri}$, as previously described, is also used for the primary-side temperature spread $\Delta T_{sec}$, it is already available at this point and can be used. The temperature drop $\Delta T_{pri\text{-}sec}$ can be determined in one of the ways described above by means of one of equations 15 or 16 or 17 and 18.

The complete calculation rule for the weighting factor k is obtained considering a real transfer point (i.e. with the temperature drop) and with mixer-affected consumer circuits 5a through use, for example, of equations G11a with G14 and 016, and G21 with G22, G18 and G16 in equation G19:

$$k = \frac{\dot{V}_{pri} \cdot \Delta T_{pri}}{\dot{V}_{sec} \cdot \Delta T_{sec}} \text{ with} \tag{G19}$$

$$\dot{V}_{sec} = \sum_{1}^{n} (\dot{V}_{consumer,i} \cdot C_i) \text{ with} \tag{G11a}$$

$$C_i = \frac{T_{VL,consumer,i} - T_{RL,consumer,i}}{T_{VL,pri} - \Delta T_{pri\text{-}sec} - T_{RL,consumer,i}} \tag{G14}$$

$$\Delta T_{sec} = T_{VL,pri} - \Delta T_{pri\text{-}sec} - T_{RL,sec} \tag{G20+G21}$$

$$T_{RL,sec} = \frac{\sum (\dot{V}_{sec,i} \cdot T_{RL,sec,i})}{\sum \dot{V}_{sec,i}}. \tag{G18}$$

$$\Delta T_{pri\text{-}sec} = T_{VL,pri} - T_{VL,consumer,i} \tag{G16}$$

On a nested representation, the calculation rule for the weighting factor k is omitted at this point for reasons of clarity and readability. Nevertheless, the calculation rule can be represented and calculated as a mathematically self-contained expression.

With the software factor k determinable in this way, the set volume flow rate $\dot{V}_{pri,soll}$ to be controlled in the case of the primary-side centrifugal pump 17 can then be calculated according to equation 5 and set correspondingly in the pump control.

Figure 5:
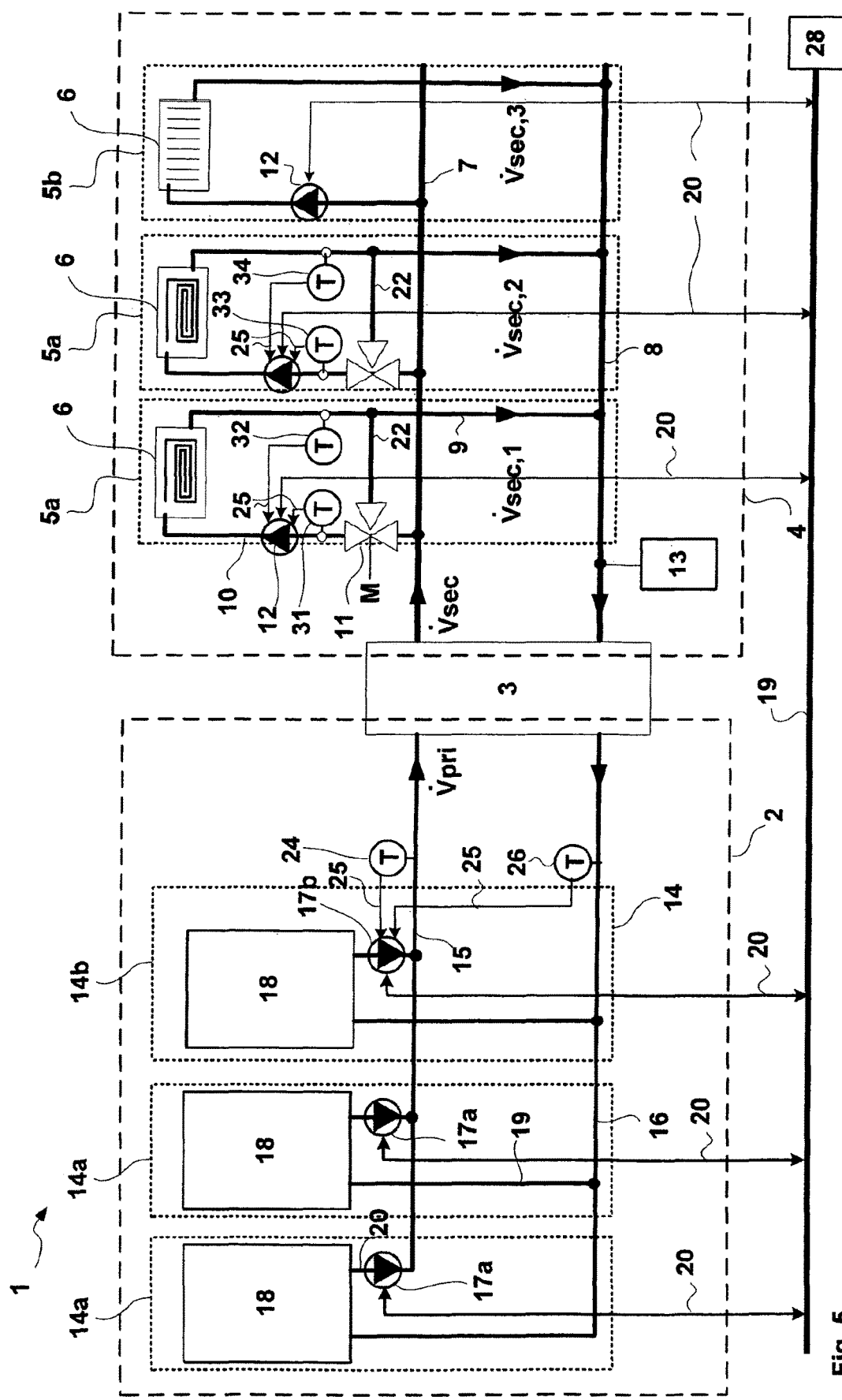
FIG. 5 shows an expansion of the heating system according to FIG. 3 through more than one generator circuit in the primary circuit.

The centrifugal pump 17 to be controlled illustrated in FIGS. 1 and 2 in the primary circuit 2 can be a generator pump 17b as is illustrated in FIG. 3, 4 or 5 in the flow 15 of a generator 18, or can be a feeder pump 17c, as is arranged in FIG. 4 in the flow 35 of a feeder circuit 30. Of course, the generator pump 17b and the feeder pump 17c can also be arranged in the corresponding return flow.

According to a design variant of the heating system 1 illustrated in FIG. 5 the primary circuit 2 can comprise more than one generator circuit 14. Three such generator circuits 14a, 14b are illustrated in FIG. 5. Each generator circuit can comprise one or more generators 18, although only one generator 18 per generator circuit 14a, 14b is illustrated in FIG. 5. The generators prepare the heating line or in the case of a cooling system, the cooling line.

A generator pump 17a, 17b is assigned to each generator circuit 14a, 14b which drives the heating medium in each local flow 20 and conveys it into the central flow 15. For a heating system 1 of this type, it is not necessary to control all generator pumps 17a, 17b, or to control them identically. Rather, the varying, if necessary incurred peak load can be covered with one of the individual generator circuits 14b and the base load is provided with the other generator circuits 14a. The generators 18 in these circuits 14a run with maximum thermal conduction. The same applies for its base load pumps 17a. Only the pump 17b for the peak load generator circuit 14b adapts to the fluctuations in the consumer-side volume flow rate in order to achieve an energy-efficient heating pump control. Thus, the method according to the invention must also be applied only to this peak load pump 17b, while the base load pumps 17a are not controlled or are controlled in another way.

The generator 18 in the peak load generator circuit 14b modulates its thermal conduction corresponding to the desired central primary-side flow temperature $T_{VL,pri}$ or the central secondary-side flow temperature $T_{VL,sec}$, wherein the peak load pump 17b is adapted. If the thermal conduction reaches a setting limit without the desired flow temperature $T_{VL,pri}$ or $T_{VL,sec}$ being reached, a base load generator circuit 14a including the associated generator(s) and associated base load pump 17a must be switched off or switched on.

According to a design variant of the method according to the invention, now the one generator pump 17b which is assigned to the peak load generator circuit 14b, is controlled in such a way that the total volume flow rate $\dot{V}_{pri}$ on the primary side 2 corresponds to the volume flow rate $\dot{V}_{sec}$ on the secondary side. This means that the volumetric flow rate, must also be taken into account by the generator pump(s) 17a, which is/are assigned to a base load generator circuit 14a. The pump assigned to the peak load generator circuit 14b is therefore, in the context of this invention, is also called a peak load pump 17b, and the pump or pumps 17a associated with the base load generator circuit(s) 14a are also called base load pumps.

If it is assumed that there is a number m of generator circuits 14a, 14b available for which the pth generator circuit 14b serves the peak load and the other generator circuits the base load, this arises in the same way as equation G1:

$$\left( \sum_{i=1}^{p-1} \dot{V}_{pri,i} + \dot{V}_{pri,p} + \sum_{j=p+1}^{m} \dot{V}_{pri,j} \right) \cdot \rho_{pri} \cdot c_{p,pri} \stackrel{!}{=} \dot{V}_{sec} \cdot \rho_{sec} \cdot c_{p,sec} \quad (G22)$$

Suitably, as described in the previous exemplary embodiments, the conveying flow rate $\dot{V}_{pri,p}$ of the pump 17b to be controlled represents the desired set point variable. By switching from equation G22, the volume flow rate control according to the invention then results for this set point variable:

$$\dot{V}_{pri,k,soll} \stackrel{!}{=} k \cdot \dot{V}_{sec} - \sum_{i=1}^{p-1} \dot{V}_{pri,i} - \sum_{j=p+1}^{m} \dot{V}_{pri,j} \quad \text{with} \quad (G23)$$

$$k = \frac{\rho_{sec} \cdot c_{p,sec}}{\rho_{pri} \cdot c_{r,pri}}$$

Thus, the calculation rule for the set point variable $\dot{V}_{pri,R,soll}$ in the design variant with more than one generator circuit 14 differs from that according to equation G5 only in that the volume flow rates of the one or more other generator circuits(s) 14, i.e. the base load pumps are also determined and subtracted from the determined, optionally weighted volume flow rate $\dot{V}_{sec}$ of the secondary side 4. The volume flow rates of the generator pumps 14a, 14b can be determined by measurement or calculation, analogously to the previous descriptions, either inside the corresponding pump or outside thereof, either by means of the pump itself or by means of a volume flow rate measuring device.

The determined volume flow rates of the base load generator circuits 14a are then transmitted to the peak load pump 17b or to another evaluation unit in order to determine the primary-side set volume flow rate $\dot{V}_{pri,k,soll}$ for the peak load pump 17b to be controlled. The transmission can be carried out via radio or as shown in FIG. 5 via the data cables 20 and the data network 19.

The calculation of the secondary volume flow rate $\dot{V}_{sec}$ in equation G23 can be carried out as in the other design variants, in particular according to one of the equations G6, G7 or G11a, in particular also for circuits with different media on the primary side 2 and the secondary side 4 according to equation G19.

According to another design variant (not shown) for example, the varying peak load arising as required can be covered by two generator circuits 14b, whereas the base load is provided by the other generator circuit(s) 14a. The base load generators 18 in this circuit 14a run with maximum thermal conduction. The same applies for its base load pump 17a. Only the pumps 17b of the peak load generator circuit 14b adapt to the fluctuations in the consumer-side volume flow rate in order to achieve an energy-efficient heating pump control. Thus, the method according to the invention in this design variant is (only) used on these peak load pumps 17b while the base load pump 17a is not controlled or is controlled in another manner. Thus, two first primary-side circulation pumps are provided which are controlled according to the invention.

According to a design variant of the method according to the invention, now the generator pumps 17b which are assigned to the peak load generator circuits 14b, are controlled in such a way that the total volume flow rate $\dot{V}_{pri}$ on the primary side 2 corresponds to the volume flow rate $\dot{V}_{sec}$ on the secondary side.

The volume flow rate which is formed by the sum of a peak load generator circuit 14b is determined in the same way as equation G23 and this volume flow is distributed evenly or in a predetermined ratio to the peak load pumps 17b The volume flow rate ratio thus corresponds to the ratio of the thermal conduction of the peak load generator circuit.

Figure 6:
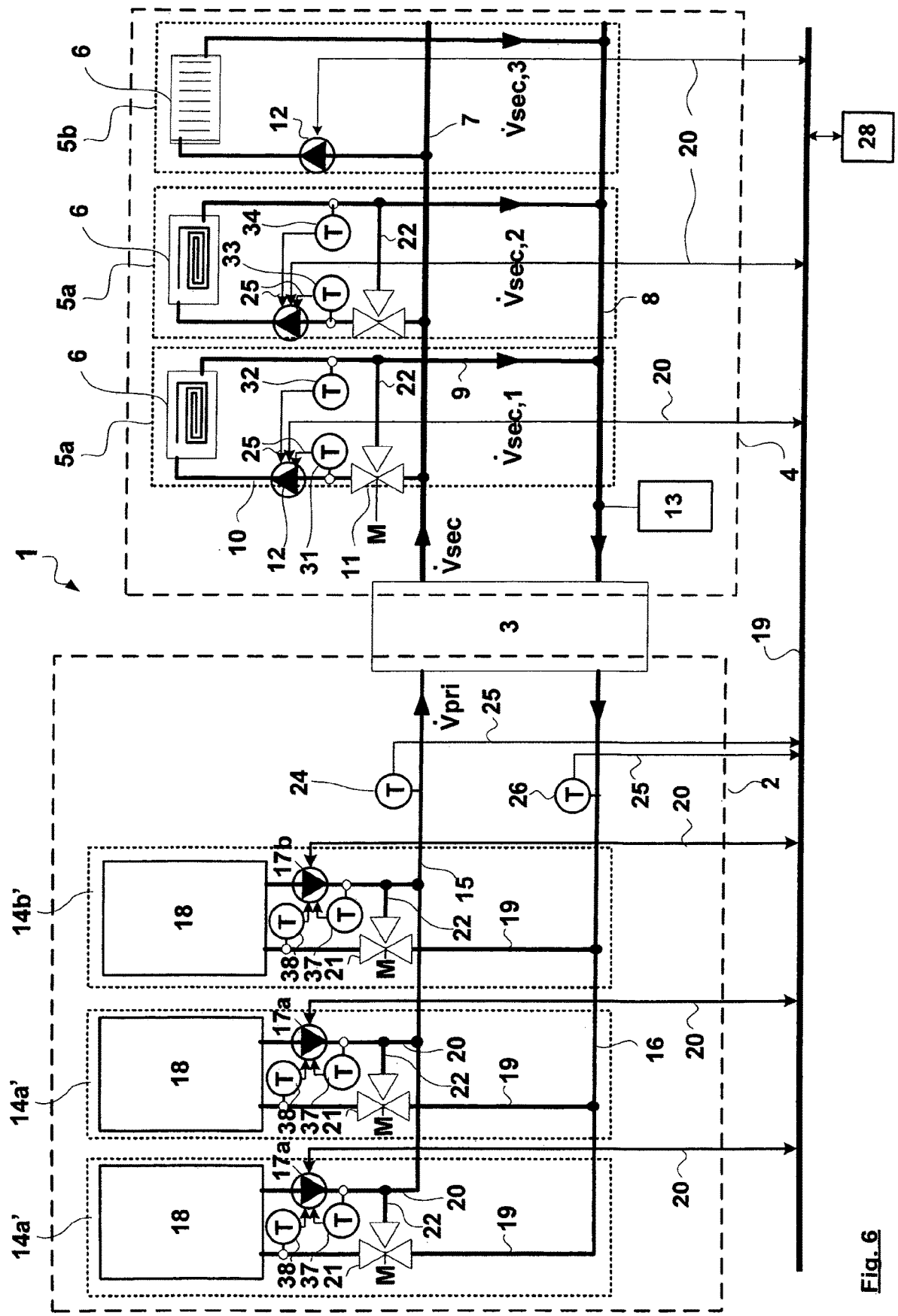
FIG. 6 shows an expansion of the heating system according to FIG. 5 through temperature measurement points and return mixers in the generator circuits.
Figure 7:
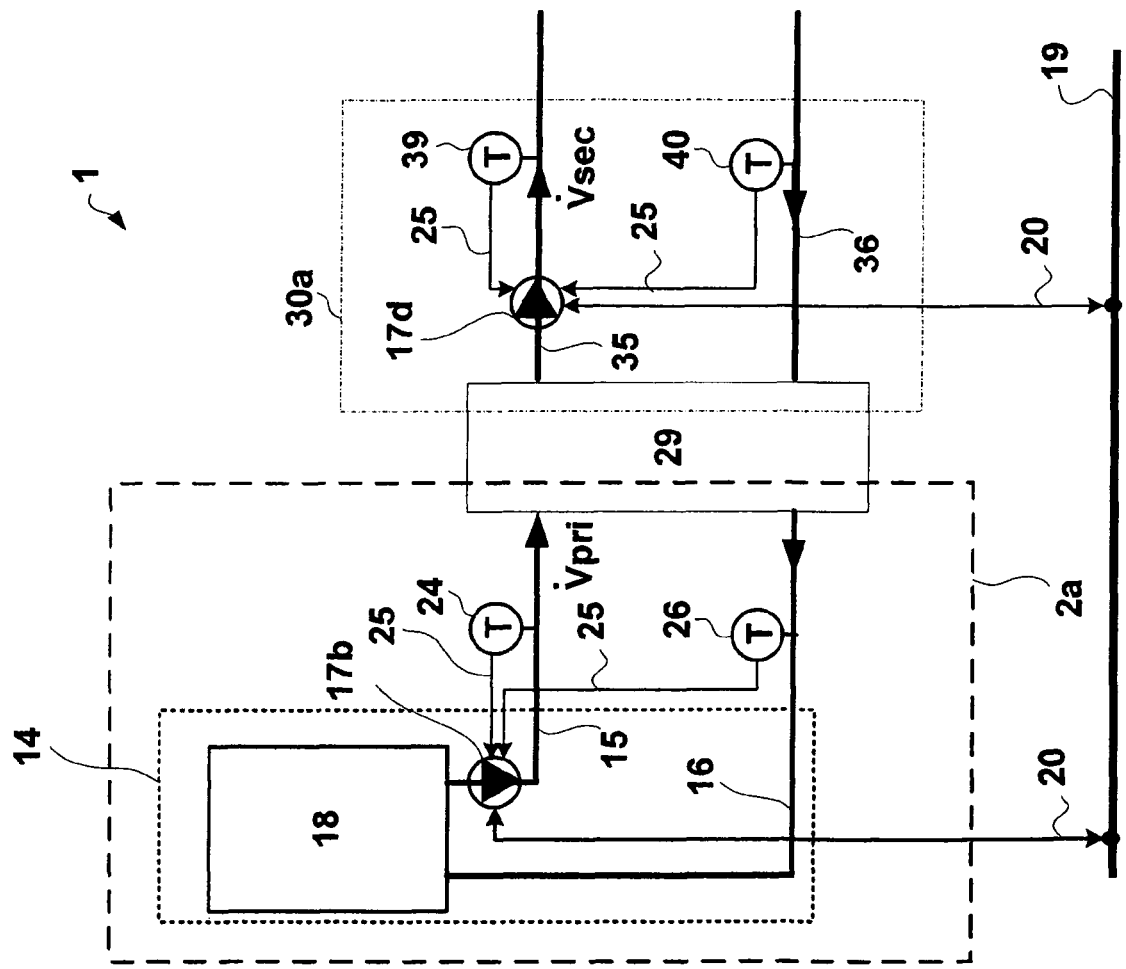
FIG. 7 shows a schematic representation of a part of another exemplary heating system with a primary-side generator circuit and a feeder circuit coupled thereto via a transfer point.
Figure 8:
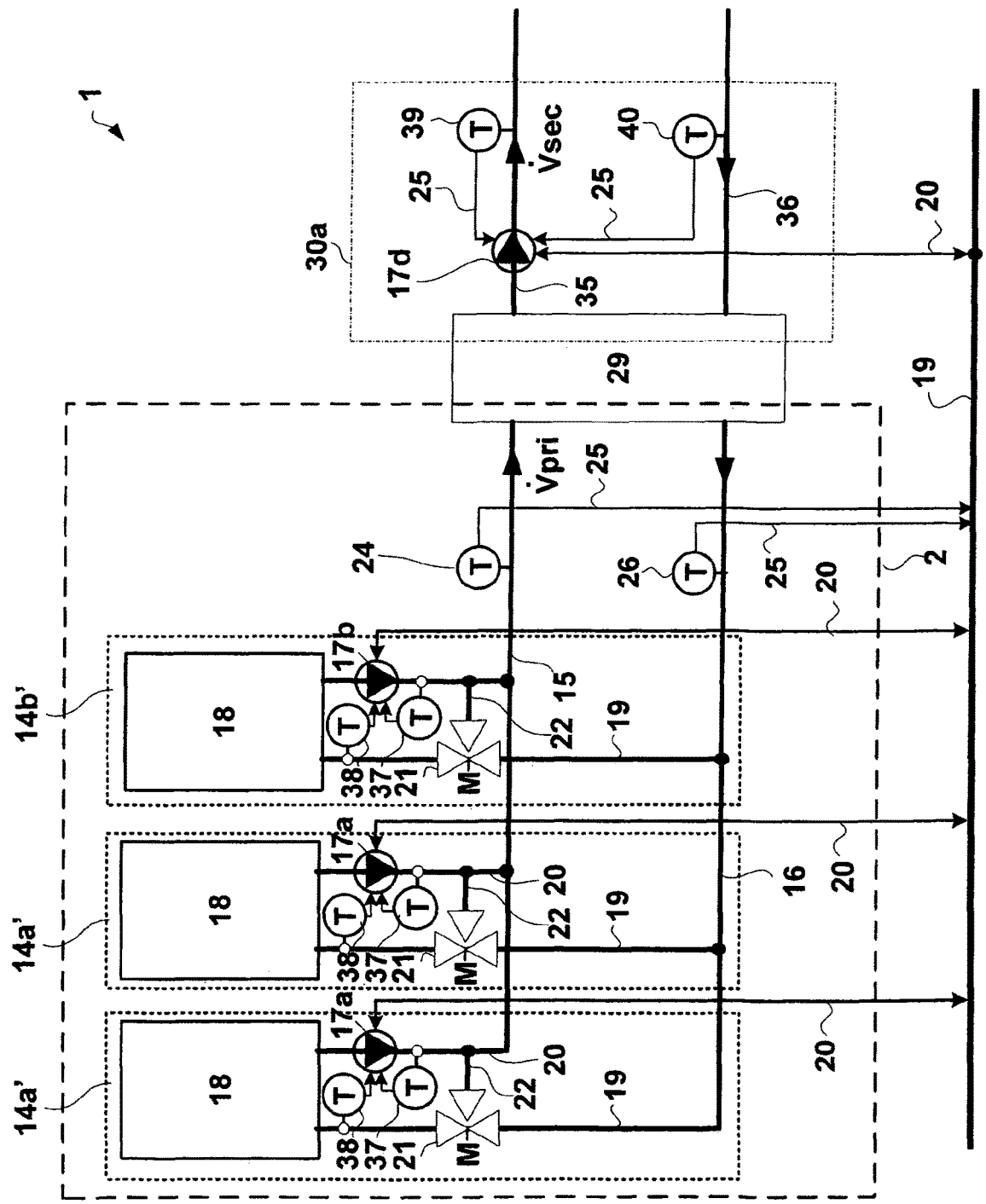
FIG. 8 shows an expansion of the heating system according to FIG. 7 through more than one generator circuit in the primary circuit.

According to a further development of one of the above-mentioned design variants, in the generator circuit 14 or one, a plurality of or all generator circuits 14a, 14b a mixer 21 can be arranged in the primary return line 16 or primary local return line 19. Such generator circuits 14a', 14b' with generator circuits are illustrated in FIG. 6, wherein here both the base load generator circuit and the peak load generator circuit comprise such a mixer 21.

In this return flow mixer 21 medium from the local flow line 10 is admixed to the return line 9 via the mixing line 22 to raise the return flow temperature. Such an arrangement is above all useful for heating systems which have a constant temperature boiler 18 or a cogenerator unit on the primary side. On such generator circuits 14a', 14b', the previously described relationships and calculations can be applied analogously.

The generator-specific primary volume flow rate $\dot{V}_{pri,i}$ of a generator circuit 14a', 14b' with a mixer can in this case be calculated from the corresponding generator circuit volume flow rate $\dot{V}_{producer,i}$ in the same way as equation G7 and equation G10 inserted therein, as following from equations G24a and G24b:

$$\dot{V}_{pri,i} = R_i \cdot \dot{V}_{producer,i} \text{ with.} \quad (G24a)$$

$$R_i = \frac{T_{VL,producer,i} - T_{RL,producer,i}}{T_{VL,producer,i} - T_{RL,pri}}. \quad (G24b)$$

wherein $\dot{V}_{pri,i}$ is the generator circuit volume flow rate flowing into the ith generator circuit 14a', 14b' (volume flow rate after the return flow mixer 21), $\dot{V}_{producer,i}$ is the generator volume flow rate flowing through the ith generator circuit 14a', 14b' or the generator(s) 18 (volume flow rate before the return flow mixer 21), $R_i$ is a generator-specific compensation value, $T_{VL,producer,i}$ is the temperature in the primary local flow 20 before the branch to the return flow mixer 21 in the ith generator circuit 14a', 14b', $T_{RL,producer,i}$ is the temperature in the primary local return flow 19 behind the return flow mixer 21 in the ith generator circuit 14a', 14b' and $T_{RL,pri}$ is the temperature in the central primary-side return flow 16.

In a representation of the physical relationship, these are dispensed with as they are the same as the consumer circuits with flow mixers 11. Thus, the previous embodiments can be returned to.

In order to be able to calculate each generator-specific compensation value according to equation G24b, the corresponding temperatures $T_{VL,producer,i}$ and $T_{RL,producer,i}$ of the local secondary flow line 20 and the local secondary return line 19 are required. These are determined according to the invention and transmitted to the evaluation point for calculation of the set volume flow rate, i.e. to the primary centrifugal pump 17 or the peak load pump 17b to be controlled, or to an external evaluation unit. As in the other design variants, the determination can be carried out by measuring, calculated from other measured quantities or by estimating from model quantities. And as in the other design variants the determination can be carried out via radio or via cables, in particular via media lines 25 and the data network 19, which puts the determination location in communication with the evaluation point.

As is clear from FIG. 6, for example, the temperature $T_{VL,producer,i}$ can be measured in the primary local flow 20 of a generator circuit 14a', 14b' before the branch to the return flow mixer 21 by means of a temperature sensor 37 and transmitted to the pump electronics system of the generator pump 17a, 17b of this generator circuit. Furthermore, the temperature $T_{RL,producer,i}$ can be measured in the primary local return flow 20 of a generator circuit 14a', 14b' behind the return flow mixer 21 by means of the temperature sensor 28 and transmitted to the pump electronics system of the generator pump 17a, 17b of this generator circuit 14a', 14b'. The temperature sensor 37 arranged in the local flow 20 can be integrated into the corresponding generator pump 17a, 17b and transmit its measuring signal directly to its pump electronics system. Alternatively, it can, as in the temperature sensor 28 arranged in the local return flow 19, be connected to the pump electronics system of the said pump 17a, 17b via a sensor line 25.

As shown in FIG. 4, the transfer point 3 to the consumer circuits 4 can be switched to a feeder circuit 30 in order to overcome long distances and associated pressure losses. This feeder circuit 30 is directly attached to the primary side of the transfer point 3 and is connected to the secondary side of a second transfer point 29 which again on its primary side attaches to the generator circuit 14. In the example according to FIG. 4 an individual generator circuit 14 is provided on the generator side. In this design variant the feeder pump 17c arranged in the feeder circuit 30 is controlled according to the invention, i.e. its volume flow rate is controlled depending on the sum of the consumer-specific volume flow rates.

For the generator pump 17b arranged in the generator circuit 14 this volume flow rate control can also be used. Thus, this generator pump can also be controlled in its volume flow depending on the sum of the consumer-specific volume flow rates. This can take place in two ways, namely directly or indirectly.

According the direct way, the generator pump 17b can be informed of the necessary volume flow rate set point, for example whether from the feeder pump 17c which calculates this value, or from the central evaluation unit. However, the generator pump 17b can also calculate the volume flow rate set point itself. For this purpose the required volume flow rate and temperature values are correspondingly transmitted from the consumer circuits 5a, 5b and the feeder circuit 30 to the generator pump 17b. In both case, basically no temperatures need to be determined in the generator circuit 14.

According to the indirect way, the generator pump is controlled in such a way that its volume flow rate is controlled by the actual volume flow rate of the feeder pump 17c. All things considered, this case is handled as if the feeder circuit 30 were an or the only consumer circuit. From a control point of view, the second transfer point 29 then emerges at the point of the first transfer point 3. In this case, the generator pump 17b must not be controlled by the total volume flow rate, but rather only by the one volume flow rate in the feeder circuit, which with the use of different media is optionally to be multiplied by the weighting factor k Incidentally, this case is to be handled in the same way as the above-mentioned embodiments and equations.

The same applies for a case (not shown in the figures) where on the generator side more than one generator circuit 14 is provided. Where in the preceding exemplary embodiments explained by FIGS. 5 and 6, in this case only one generator pump 17b must be controlled according to the invention in its volume flow rate, namely that which provides fluctuations in the thermal conductivity of the consumer while the other pumps provide a base load. This peak load pump 17b can either be controlled according to the entire consumer-side total volume flow rate or according to the simple feeder-side volume flow rate.

LIST OF REFERENCE NUMERALS

1 Heating system
2 Primary circuit to the first transfer point

2a Primary circuit to the second transfer point
3 First transfer point
3a Countercurrent plate heat exchanger
3b Hydraulic separator
3c Low-loss distributor
4 Secondary circuit
5 Consumer circuit
6 Consumer
7 Central secondary flow line
8 Central secondary return manifold
9 Local secondary flow line
10 Local secondary return line
11 Mixer, flow mixer
12 Circulation pump, consumer circuit pump
13 Expansion vessel
14 Generator circuit
14a Generator circuit for base load
14b Generator circuit for peak load
15 Primary flow line
16 Primary return line
17 Circulation pump
17a Generator pump for base load
17b Generator pump for peak load
17c, 17d Feeder pump
18 Generator/boiler
19 Data network
20 Data cable
21 Mixer, return flow mixer
22 Mixer line
23 Bypass
24 Flow temperature sensor in primary circuit
25 Temperature sensor line
26 Return flow temperature sensor in primary circuit
28 Central communication device
29 Second transfer point
30 Feeder circuit, secondary circuit to the first transfer point
31 Flow temperature sensor in the first consumer circuit
32 Return flow temperature sensor in the first consumer circuit
33 Flow temperature sensor in the second consumer circuit
34 Return flow temperature sensor in the second consumer circuit
35 Flow feeder circuit
36 Return flow feeder circuit
37 Flow temperature sensor in the feeder circuit
38 Return flow temperature sensor in the feeder circuit

What is claimed is:

1. Method for controlling at least one first circulation pump (17b, 17c) of a heating or cooling system (1) having a primary circuit (2, 2a) and a secondary circuit (4, 30a) coupled therewith at a transfer point (3, 29), wherein the first circulation pump (17, 17b, 17c, 17b') conveys a heating or cooling medium in the primary circuit (2, 2a) and in the secondary circuit (4, 30a) at least one second circulation pump (12, 17d) is located that conveys a heating or cooling medium in at least one partial area of the secondary circuit (4, 30a), characterized in that the volume flow rate ($\dot{V}_{pri}$, $\dot{V}_{pri,i}$) of the first circulation pump (17, 17b, 17c, 17b') is controlled in functional dependence of the volume flow rate ($\dot{V}_{sec}$) of the secondary circuit (4, 30) behind the transfer point (3, 29).

2. Method according to claim 1, characterized in that the first circulation pump (17, 17b, 17c, 17b') is controlled in such a way that the volume flow rate ($\dot{V}_{pri}$) of the primary circuit (2, 2a) in front of the transfer point (3, 29) is in a defined relationship (a) to the volume flow rate ($\dot{V}_{sec}$) of the secondary circuit (4, 30a) behind the transfer point (3, 29), or corresponds to the volume flow rate ($\dot{V}_{sec}$) of the secondary circuit (4, 30a) behind the transfer point (3, 29).

3. Method according to claim 1, characterized in that the first circulation pump (17, 17, 17c, 17b') is controlled in such a way that the volume flow rate ($\dot{V}_{pri}$) of the primary circuit (2, 2a) in front of the transfer point (3, 29) adheres to a predetermined distance (b) to the volume flow ($\dot{V}_{sec}$) of the secondary circuit (4, 30) behind the transfer point (3, 29) or to a value (a·$\dot{V}_{sec}$) determined from the volume flow ($\dot{V}_{sec}$) of the secondary circuit (4, 30) behind the transfer point (3, 29).

4. Method according to claim 1, characterized in that the volume flow rate ($\dot{V}_{sec}$) of the secondary circuit (4, 30a) is measured or calculated behind the transfer point (3, 29) and is selected as the set point ($\dot{V}_{pri,soll}$, $\dot{V}_{pri,i,soll}$) at the first circulation pump (17b, 17c) or in that a set point ($\dot{V}_{pri,soll}$, $\dot{V}_{pri,i,soll}$) for the volume flow rate of the first circulation pump (17b, 17c) is calculated from the measured or calculated volume flow rate ($\dot{V}_{sec}$) of the secondary circuit (4) and is set at the first circulation pump (17b, 17c).

5. Method according to claim 4, characterized in that the secondary circuit (4) comprises one or a number (n) of consumer circuit(s) (5, 5a, 5b) in parallel, in which at least one consumer (6) consumes the respective heat or coolness from the heating or cooling medium, and in which an independently controlled consumer pump (12) in series with the respective consumer (6) conveys the heating or cooling medium in the respective consumer circuit (5a, 5b), and in that in each of the consumer circuits (5a, 5b) the respective consumer circuit volume flow rate ($\dot{V}_{sec,i}$) is measured or calculated and these consumer circuit volume flow rates ($\dot{V}_{sec,i}$) are added to obtain a total volume flow rate ($\dot{V}_{sec}$) of the secondary circuit (4) and in that the total volume flow rate ($\dot{V}_{sec}$) is selected as the set point ($\dot{V}_{pri,soll}$, $\dot{V}_{pri,i,soll}$) at the first circulation pump (17b, 17c) or calculated from a set point ($\dot{V}_{pri,soll}$, $\dot{V}_{pri,i,soll}$) and selected at the first circulation pump (17, 17c).

6. Method according to claim 5, characterized in that in one, two, a plurality or all consumer circuits (5a) one flow mixer or one flow mixer (11) in each is arranged which admixes a part of the heating or cooling medium of its return flow (9) to a respective local flow (10) of the corresponding consumer circuit (5) by means of a mixer line (22), and in that a consumer volume flow rate ($\dot{V}_{consumer,i}$) is determined in each consumer circuit (5a) in the flow direction behind the flow mixer (11) or before branching off of the mixer line (22), and this determined consumer volume flow rate ($\dot{V}_{consumer,i}$) is multiplied by a consumer circuit-specific compensation value ($C_i$) to obtain the respective consumer circuit volume flow rate ($\dot{V}_{sec,i}$).

7. Method according to claim 6, characterized in that the consumer circuit-specific compensation value (Ci) is formed by the ratio of a first to a second temperature difference, wherein the first temperature difference is between the local flow (10) behind the flow mixer (11) and the local return flow (9) of the respective consumer circuit (5a) and the second temperature difference is between the central secondary-side flow (7) or primary-side flow (15) and the local return flow (9) of the respective consumer circuit (5a).

8. Method according to claim 7, characterized in that the temperature in the local flow (10) is measured behind the flow mixer (11) and in the local return flow (9) of the respective consumer circuit (5a) as well as the temperature in the central secondary-side flow (7) or the primary-side flow (15).

9. Method according to claim 7, characterized in that the first or second temperature difference is calculated and saved and is updated each time if the flow mixer (11) of the respective consumer circuit is completely opened again in the through flow direction to the consumer.

10. Method according to claim 6, characterized in that the consumer circuit-specific compensation value ($C_i$) is calculated from $$C_i = \frac{T_{VL,consumer,i} - T_{RL,consumer,i}}{T_{VL,pri} - \Delta T_{pri\text{-}sec} - T_{RL,consumer,i}}$$

wherein $C_i$ is the consumer circuit-specific compensation value of an ith consumer circuit (5a), $T_{VL,consumer,i}$ is the temperature in the local flow (10) behind the flow mixer (11) of the ith consumer circuit (5a), $T_{RL,consumer,i}$ is the temperature in the local return flow (9) of the ith consumer circuit (5a), $T_{VL,pri}$ is the temperature in the central primary-side flow (15) and $\Delta T_{pri\text{-}sec}$ is the temperature drop from the primary side to the secondary side of the transfer point (3).

11. Method according to claim 10, characterized in that the temperature drop ($\Delta T_{pri\text{-}sec}$) is determined in that in a consumer circuit (5b) without a flow mixer the difference between the primary flow temperature ($T_{VL,pri}$) and the secondary local flow temperature ($T_{VL,sec,i}$) is calculated, or in that in a consumer circuit (5a) with a return flow medium mixed in the flow (7) with a completely opened flow mixer (11), the difference between the primary flow temperature ($T_{VL,pri}$) and the secondary local flow temperature ($T_{VL,consumer,i}$) is calculated behind the flow mixer (11).

12. Method according to claim 5, characterized in that the determined consumer circuit volume flow rates ($\dot{V}_{sec,i}$) from the consumer pumps (12) are transmitted from the first circulation pump (17, 17b, 17c) and/or a central evaluation unit (28) to calculate the volume flow rate set point ($\dot{V}_{pri,soll}$, $\dot{V}_{pri,i,soll}$).

13. Method according to claim 1, characterized in that with different media in the primary circuit (2) and secondary circuit (4) the volume flow rate ($\dot{V}_{sec}$) of the secondary circuit (4, 30a) is weighted with a factor (k) which corresponds to the product of the density ratio and heat capacity ratio of the two media and in that this weighted volume flow rate ($\dot{V}_{sec}$) is selected as the set point ($\dot{V}_{pri,soll}$, $\dot{V}_{pri,i,soll}$) at the first circulation pump (17b, 17c) or calculated from a set point ($\dot{V}_{pri,soll}$, $\dot{V}_{pri,i,soll}$) for the volume flow rate of the first circulation pump (17b, 17c) and selected at the first circulation pump (17b, 17c).

14. Method according to claim 13, characterized in that the factor (k) is determined from the temperature difference ($\Delta T_{pri}$) and the volume flow rate ($\dot{V}_{pri}$) in the primary circuit (2) of the transfer point (3) as well as the temperature difference ($\Delta T_{sec}$) and the volume flow rate ($\dot{V}_{pri}$) in the secondary circuit (4) according to the equation;

$$k = \frac{\dot{V}_{pri} \cdot \Delta T_{pri}}{\dot{V}_{sec} \cdot \Delta T_{sec}}$$

wherein k is the weight factor, $\dot{V}_{pri}$ is the total volume flow rate in the primary circuit (2), $\dot{V}_{sec}$ is the total volume flow rate in the secondary circuit (4), $\Delta T_{pri}$ is the temperature difference on the primary side of the transfer point (3), and $\Delta T_{sec}$ is the temperature difference on the secondary side of the transfer point (3).

15. Method according to claim 1, characterized in that the primary circuit (2, 2a) comprises a number (m) of generator circuits (14, 14a, 14b, 14a', 14b') connected in parallel, in which respectively at least one heating or cooling generator (18) respectively heats or cools the heating or cooling medium and a generator pump (17, 17a, 17b, 17a', 17b') in series with the respective heating or cooling generator (18) conveys a generator-specific volume flow rate ($\dot{V}_{pri,i}$), wherein the first circulation pump (17, 17b, 17b') to be controlled is one of these parallel generator pumps (17, 17b, 17b') which lies in a peak load generator circuit (14b), and wherein the generator circuit volume flow rates ($\dot{V}_{pri,i}$) of the generator circulation pumps (17, 17a, 17b, 17a',17b') of all generator circuits (14a, 14a') providing a thermal base load are each determined and the sum of which is provided, and in that this sum is subtracted from the determined secondary volume flow rate ($\dot{V}_{sec}$) and this difference is selected as the set point ($\dot{V}_{pri,i,soll}$) at the first circulation pump (17, 17b, 17b') or calculated from a set point ($\dot{V}_{pri,i,soll}$) for the volume flow rate of the first circulation pump (17, 17b, 17b') and selected at the first circulation pump (17, 17b, 17b').

16. Method according to claim 1, characterized in that the primary circuit (2, 2a) comprises a generator circuit (14) or a number (m) of generator circuits (14, 14a, 14b, 14a', 14b') connected in parallel, in which respectively at least one heating or cooling generator (18) respectively heats or cools the heating or cooling medium and in which a generator pump (17, 17a, 17b, 17a', 17b') in series with the respective heating or cooling generator (18) conveys a generator-specific volume flow rate ($\dot{V}_{pri,i}$), wherein the first circulation pump (17, 17b, 17b') to be controlled is one of these parallel generator pumps (17, 17b, 17b'), and wherein in one, two, a plurality or all generator circuits (14a') one return flow mixer or one return flow mixer (21) in each is arranged which admixes a part of the heating or cooling medium of its flow (20) to a respective local return flow (19) of the corresponding generator circuit (5) by means of a mixer line (22), and a generator volume flow rate ($\dot{V}_{producer,i}$) is selected in each generator circuit (14a') in the flow direction behind the return flow mixer (11) or before branching off of the mixer line (22), and this determined generator volume flow rate ($\dot{V}_{producer,i}$) is multiplied by a generator circuit-specific compensation value ($R_i$) to obtain the respective generator circuit volume flow rate ($\dot{V}_{pri,i}$).

17. Method according to claim 16, characterized in that the generator circuit-specific compensation value ($R_i$) is calculated from $$R_i = \frac{T_{VL,producer,i} - T_{RL,producer,i}}{T_{VL,producer,i} - T_{RL,pri}}$$

wherein $R_i$ is a generator-specific compensation value, $T_{VL,producer,i}$ is the temperature in the primary local flow 20 in the ith generator circuit 14a', 14b', $T_{RL,producer,i}$ is the temperature in the primary local return flow 19 behind the return flow mixer 21 in the ith generator circuit 14a', 14b' and $T_{RL,pri}$ is the temperature in the central primary-side return flow 16.

18. Pump system with at least one first circulation pump (17b, 17c) for conveying a heating or cooling medium in a primary circuit (2) of a heating or cooling system (1) and at least one second circulation pump (12, 17d) for conveying a heating or cooling medium in at least a partial area of a secondary circuit (4, 30a) coupled with the primary circuit (2) via a transfer point (3), characterized in that it is configured for implementing the method at least according to claim 1.

19. Circulation pump (17b, 17c) for conveying a heating or cooling medium in a primary circuit (2) of a heating or cooling system (1) with a pump electronics system for determining a set point ($\dot{V}_{pri,soll}$, $\dot{V}_{pri,i,soll}$) characterized in that it is adjustable in its volume flow rate ($\dot{V}_{pri}, \dot{V}_{pri,i}$) and is configured for it, to calculate a volume flow set point ($\dot{V}_{pri,soll}$, $\dot{V}_{pri,i,soll}$) itself in functional independence of the volume flow rate ($\dot{V}_{pri,soll}$, $\dot{V}_{pri,i,soll}$) of at least one other circulation pump (12, 17d) for intended conveying of a heating or cooling medium in a secondary circuit (4) of the heating or cooling system (1).

\* \* \* \* \*